(12) United States Patent
Miyazaki et al.

(10) Patent No.: US 7,753,146 B2
(45) Date of Patent: Jul. 13, 2010

(54) LEG TYPE MOBILE ROBOT

(75) Inventors: Susumu Miyazaki, Saitama (JP); Makoto Shishido, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/068,074

(22) Filed: Feb. 1, 2008

(65) Prior Publication Data

US 2008/0185985 A1    Aug. 7, 2008

(30) Foreign Application Priority Data

Feb. 2, 2007   (JP) ............... 2007-024758

(51) Int. Cl.
*B25J 5/00* (2006.01)
(52) U.S. Cl. ............. 180/8.6; 180/8.5; 318/568.12
(58) Field of Classification Search .......... 180/8.1, 180/8.2, 8.5, 8.6; 901/1; 318/658.12
See application file for complete search history.

(56) References Cited

U.S. PATENT DOCUMENTS

| 5,455,497 | A | * | 10/1995 | Hirose et al. | ........... 318/568.12 |
| 6,401,846 | B1 | | 6/2002 | Takenaka et al. | |
| 7,228,923 | B2 | * | 6/2007 | Takenaka et al. | ............. 180/8.6 |
| 7,409,265 | B2 | * | 8/2008 | Takenaka et al. | ............. 700/245 |
| 7,525,275 | B2 | * | 4/2009 | Ohta et al. | ............. 318/568.12 |
| 7,609,591 | B2 | * | 10/2009 | Suh et al. | ................. 369/13.33 |
| 2004/0238240 | A1 | | 12/2004 | Hirose et al. | |

* cited by examiner

*Primary Examiner*—Tony H. Winner
(74) *Attorney, Agent, or Firm*—Squire, Sanders & Dempsey L.L.P.

(57) ABSTRACT

A leg type mobile robot includes a foot joined to a distal end of a leg through a second joint. The foot includes a foot flat portion having a ground contact end of the foot, a movable portion joined to the second joint and configured to be movable in a first direction with respect to the foot flat portion, a shock absorber comprising first and second end portions allowed to move closer to or away from each other in a second direction, the first end portion of the shock absorber being joined to a first point of the movable portion, and a motion direction conversion mechanism configured to convert a motion of the movable portion in the first direction to a motion of the second end portion of the shock absorber in the second direction with respect to the first point of the movable portion.

10 Claims, 16 Drawing Sheets

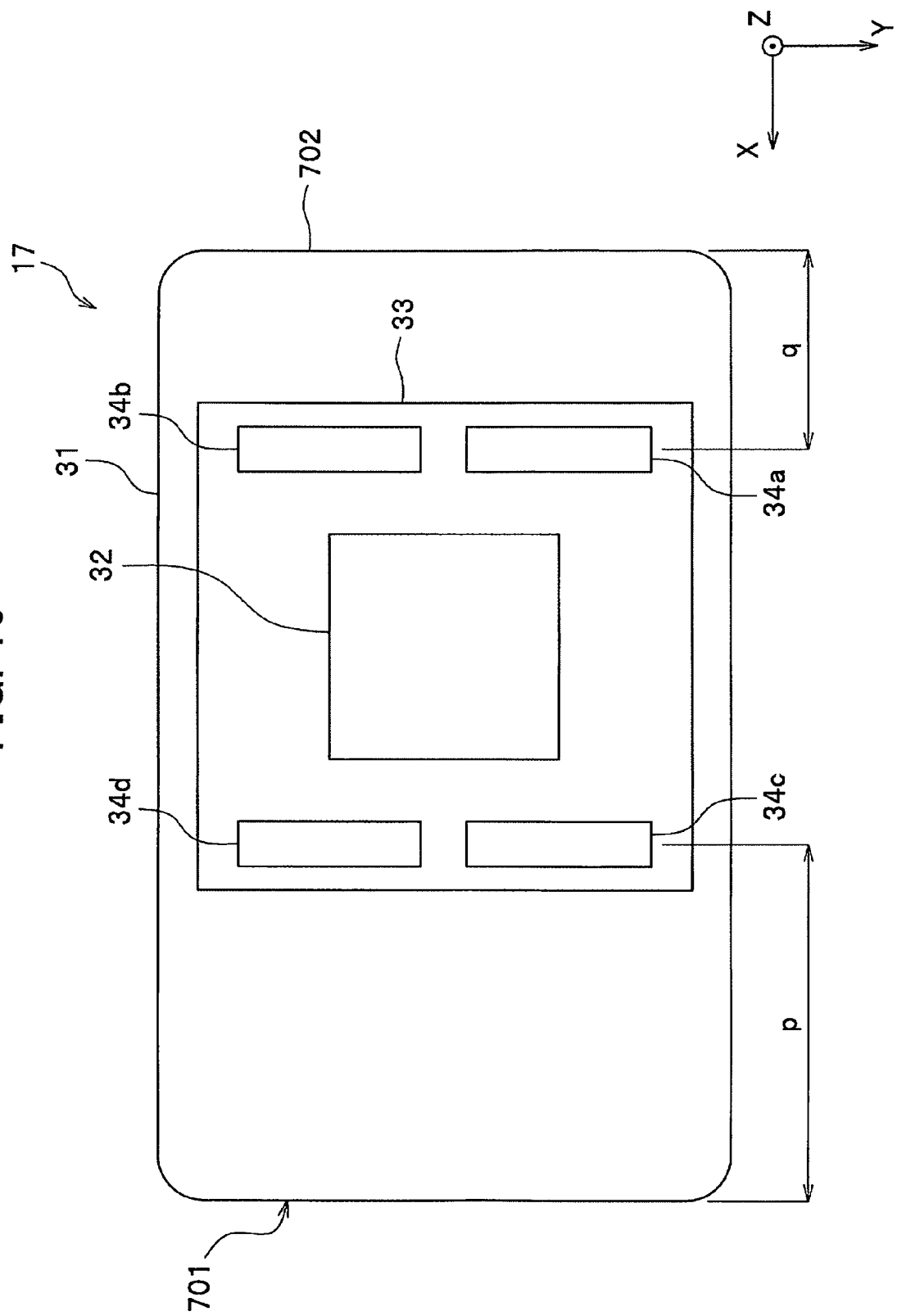

LEG TYPE MOBILE ROBOT

CROSS-REFERENCE TO RELATED APPLICATION(S)

This application claims the foreign priority benefit under Title 35, United States Code, §119 (a)-(d), of Japanese Patent Application No. 2007-024758, filed on Feb. 2, 2007 in the Japan Patent Office, the disclosure of which is herein incorporated by reference in its entirety.

BACKGROUND OF THE INVENTION

This invention relates generally to leg type mobile robots, and particularly to a foot portion structure of a leg type mobile robot.

Among various known techniques for a leg type mobile robot, a technique related particularly to the structure of a foot of the leg type mobile robot is known in the art, for example, as described in US 2004/0238240 A1. A foot of the leg type mobile robot described in US 2004/0238240 A1 connects with an end of the leg through an ankle joint, and is composed of a force sensor (e.g., six-axis floor reaction force detector) for detecting floor reaction force, a spring mechanism provided with an elastic member (rubber bushing) having an impact absorbing function, a foot sole frame, a foot sole plate and a sole, which are arranged sequentially from above. This leg type mobile robot may be configured to achieve a high accuracy of floor reaction force detection because its reaction force detector is provided near a ground contact area, and to achieve a reduction of impact given upon landing with the help of the spring mechanism.

In such a leg type mobile robot as described in US 2004/0238240 A1, the elastic member compresses in a direction perpendicular to the ground contact surface of the foot when it absorbs a shock. The elastic member typically made of rubber exhibits a relatively small stroke (displacement) of compression, which could possibly be insufficient for fully absorbing the shock caused by landing, particularly for removing a high-frequency component thereof during a landing period for which a foot is landed on the ground. Furthermore, the relatively small stroke (displacement) of compression of the elastic member provided in this leg type mobile robot would reduce the longevity of the elastic member, each time when the elastic member is compressed to produce a sufficient reaction force during a bracing period for which one foot is braced against the ground to lift the other foot. With this in view, the leg type mobile robot may include another member or mechanism for absorbing a shock caused by the movement of the foot (shock-absorbing device), other than the elastic member.

It is appreciated that the displacement (stroke) for absorbing a shock in the foot of the leg type mobile robot is greater during the bracing period than during the landing period. In other words, the reaction force in the direction perpendicular to the ground contact area of the foot is relatively greater for the bracing period in comparison with that for the landing period. It would thus be desirable to provide the foot with flexibility such that the reaction force during the landing period is relatively small while the reaction force during the gracing period is relatively great. In particular, with the trend toward high-speed locomotion of the leg type mobile robot, the leg type mobile robot moves at high speed as the case may be, in which case the reaction force acting on the foot would become greater and thus the increased locomotive stability would be in need.

The present invention has been made in an attempt to attend to the above-described need.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

In one aspect of the present invention, there is provided a leg type mobile robot with high locomotive stability ensured.

More specifically, a leg type mobile robot in one exemplary embodiment of the present invention comprises a body, a leg joined to the body through a first joint in a manner that allows the leg to be actuated, and a foot joined to a distal end of the leg through a second joint. The foot comprises a foot flat portion, a movable portion, a shock absorber, and a motion direction conversion mechanism. The foot flat portion has a ground contact end of the foot. The movable portion is joined to the second joint and configured to be movable in a first direction with respect to the foot flat portion. The shock absorber comprises first and second end portions allowed to move closer to or away from each other in a second direction different from the first direction, and the first end portion of the shock absorber is joined to a first point of the movable portion. The motion direction conversion mechanism is joined swingably to the second end portion of the shock absorber and to a second point of the movable portion, respectively, and configured to convert a motion of the movable portion in the first direction to a motion of the second end portion of the shock absorber in the second direction with respect to the first point of the movable portion.

In the leg type mobile robot implemented with this configuration, the motion direction conversion mechanism converts the motion of the movable portion in the first direction with respect to the foot flat portion (e.g., the motion of the movable portion moving closer to or away from the foot flat portion) to the motion of the shock absorber (expanding or contracting) in the second direction (i.e., the motion of the second end portion of the shock absorber moving closer to or away from the first end portion joined to the first point of the movable portion), by swinging motion of the motion direction conversion mechanism relative to the second portion of the shock absorber and to the second point of the movable portion. The motion direction conversion mechanism may comprise a bell crank or a four-bar linkage, for example. This makes it possible to increase the stroke of the shock absorber in the second direction (expanding/contracting direction) according as the quantity of compression resulting from the motion of the movable portion in the first direction increases; thus, the characteristics of the reaction force received by the action of the foot stepping on the ground surface may become nonlinear. Therefore, the shock received during the landing period can be absorbed with a relatively small reaction force, while the locomotive stability can be ensured during the bracing period with a relatively high reaction force. Hereupon, the linear characteristic or linearity refers to a phenomenon that the displacements, in the first direction (compressing direction) and in the second direction (expanding/contracting direction), are each kept at a fixed (e.g., directly proportional) rate of change. On the other hand, the nonlinear characteristic or nonlinearity refers to a phenomenon that when the displacement in the first direction (compressing direction) is relatively small, the rate of change in displacement (stroke) in the second direction (expanding/contracting direction) becomes small, and contrariwise when the displacement in the compressing direction is relatively large, the rate of change in stroke in the expanding/contracting direction becomes large.

In an exemplary and more specific embodiment, the motion direction conversion mechanism may comprise a link member comprising first and second end portions, such that the first end portion of the link member is joined swingably to the foot flat portion, and the second end portion of the link member is joined swingably to a rotation shaft provided a predetermined distance separate from the second point of the movable portion.

With this configuration, in which the link member included in the motion direction conversion mechanism is swingable about the rotation shaft provided the predetermined distance separate from the second point of the movable portion, the distance for which the movable portion can move may be extended. Accordingly, the motion direction conversion mechanism which is also joined to the second point of the movable portion is allowed to swing further, so that the stroke of the shock absorber in the second direction (expanding/contracting direction) can be increased. As a result, the nonlinear characteristic (nonlinearity) of the foot can be increased.

The second direction in which the first and second end portions of the shock absorber are allowed to move closer to or away from each other may be parallel to a plane containing the ground contact end of the foot, and the first direction in which the movable portion is configured to be movable with respect to the foot flat portion may be perpendicular to the plane containing the ground contact end of the foot.

With this feature, the leg type mobile robot is configured to convert the motion of the movable portion with respect to the foot flat portion in the (first) direction perpendicular to the plane containing the ground contact end of the foot, to the motion of the shock absorber (expanding or contracting) in the (second) direction parallel to the plane containing the ground contact end of the foot, by swinging motion of the motion direction conversion mechanism. Furthermore, the shock absorber may be disposed so that it is allowed to expand or contract in the direction parallel to the plane containing the ground contact end of the foot, and thus the characteristics of the reaction force received by the action of the foot stepping on the ground surface may become nonlinear. Since the foot joined to the distal end of the leg through the second joint, such as an ankle joint, is typically designed to have dimensions such that those in its horizontal direction (e.g., the length in its front-back or right-left direction) are greater than that in its vertical direction or the height as measured when the foot is placed on the horizontal ground, in order to improve the locomotive stability, the orientation of the shock absorber as described above (i.e., such that the expanding/contracting direction thereof is parallel to the plane containing the ground contact end of the foot, that is, the foot flat portion) makes it possible to have a stroke (displacement) of the expanding/contracting motion of the shock absorber greater than that of a conventional device which employs an elastic member (made of rubber, for example), and makes it easy to find space for storage of the shock absorber in the foot.

Alternatively, the second direction in which the first and second end portions of the shock absorber are allowed to move closer to or away from each other may be configured to form an acute angle with a plane containing the ground contact end of the foot, and the first direction in which the movable portion is configured to be movable with respect to the foot flat portion may be perpendicular to the plane containing the ground contact end of the foot.

With this feature, the leg type mobile robot is configured to convert the motion of the movable portion with respect to the foot flat portion in the (first) direction perpendicular to the plane containing the ground contact end of the foot, to the motion of the shock absorber (expanding or contracting) in the (second) direction which forms an acute angle with the plane containing the ground contact end of the foot, by swinging motion of the motion direction conversion mechanism. Furthermore, the shock absorber may be disposed so that it is allowed to expand or contract in the direction which forms an acute angle with the plane containing the ground contact end of the foot, and thus the characteristics of the reaction force received by the action of the foot stepping on the ground surface may become nonlinear. The orientation of the shock absorber as described above (i.e., such that the expanding/contracting direction thereof is configured to form an acute angle with the plane containing the ground contact end of the foot) makes it possible to have a great stroke (displacement) of the expanding/contracting motion of the shock absorber even if the horizontal dimensions of the foot (the length in its front-back direction or the width in its right-left direction) is not wide enough. Therefore, the same advantageous effects may be expected as in the case, described above, where the second direction is a direction parallel to the plane containing the ground contact end of the foot.

The aforementioned leg type mobile robot as consistent with the present invention may comprise an additional leg or legs having or not having the above features, as long as at least one leg is configured in accordance with the embodiments of the present invention as described above. The number of legs may be chosen depending upon its particular application. Also, the foot, or each of the foots joined to the distal ends of the corresponding legs through the corresponding second joints, may comprise more than one pair of the shock absorber and the motion direction conversion mechanism, in addition to the foot flat portion and the movable portion (each provided singly). The more than one pair of the shock absorber and the motion direction conversion mechanism may be arranged symmetrically with respect to a plane containing a center of the second joint and perpendicular to a plane containing the ground contact end of the foot.

To be more specific, in an exemplary embodiment, the foot that comprises a foot flat portion, a movable portion, a shock absorber and a motion direction conversion mechanism as described above may further comprise a second shock absorber, and a second motion direction conversion mechanism. The second shock absorber may comprise third and fourth end portions allowed to move closer to or away from each other in a third direction different from the first direction, wherein the third end portion of the second shock absorber is joined to a third point of the movable portion. The second motion direction conversion mechanism is joined swingably to the fourth end portion of the second shock absorber and to a fourth point of the movable portion, respectively, and configured to convert a motion of the movable portion in the first direction to a motion of the fourth end portion of the second shock absorber in the third direction with respect to the third point of the movable portion. The third and fourth points of the movable portion may be disposed symmetrical to the first and second points of the movable portion, respectively, with respect to a plane containing a center of the second joint and perpendicular to a plane containing the ground contact end of the foot.

With this feature, in the leg type mobile robot, a plurality of units in each of which the motion direction conversion mechanism and the shock absorber are provided in pair are arranged in such a manner that they are symmetrical to each other with respect to a plane containing a center of the second joint and perpendicular to a plane containing the ground contact end of the foot; therefore, shocks (impacts) received for example from front-back and/or right-left directions may be absorbed in a well-balanced manner at positions symmetrical with respect to the plane containing the center of the second joint and perpendicular to the plane containing the ground contact end of the foot. It is to be appreciated that the expanding/contracting direction (second or third direction) of the shock absorber may be arranged in any orientation in plan view, such as front-back or right-left or any other directions in-between. Such a symmetrical arrangement of more than one pair of the shock absorber and the motion direction conversion mechanism may allow the leg type mobile robot to flexibly respond to any required change in posture (to increase its locomotion speed) or in locomotion direction, and to easily move even on a bad road. Furthermore, provision of a plurality of units (pairs) of the shock absorber and the motion direction conversion mechanism in the leg type mobile robot as described above may serve to distribute the load of its self weight upon the foot.

The aforementioned leg type mobile robot may have a plurality of combinations each formed of the shock absorber and the motion direction conversion mechanism. Each of the shock absorbers in the combinations is configured such that repulsive force to repel an external force in an expanding/contracting direction thereof is adjustable based on floor reaction force acting on the shock absorber according to a position on the foot.

With this feature, in the leg type mobile robot, each of the shock absorbers in the combinations is configured such that repulsive force is adjustable based on the floor reaction force. Thus, strength of the repulsive force of the respective shock absorbers may be set according to a distance from an area in which a stronger floor reaction force is applied to the foot, to each of the shock absorbers. In other words, a shock absorber provided nearer to the aforementioned area may be set to have a stronger repulsive force. On the other hand, a shock absorber provided farther to the area may be set to have a weaker repulsive force. Further, the area in which a stronger floor reaction force is applied to the foot varies during a forward travel and a backward travel of the robot, or when the robot walks or runs. Strength of the repulsive force of each of the shock absorbers is adjustable according to how the robot travels. This makes it possible for the leg type mobile robot to walk and run with stability according to the floor reaction force to the foot during both landing on and leaving off from the floor.

In the aforementioned leg type mobile robot, the combinations of the shock absorber and motion direction conversion mechanism are disposed on both sides of the foot in a front-back direction across the second joint. The both sides are a side nearer to a tiptoe of the robot and a side nearer to a heel thereof as front and back, respectively. The repulsive force of the shock absorber disposed on the side nearer to the tiptoe is greater than the repulsive force of the shock absorber disposed on the side nearer to the heel.

With this feature, in the leg type mobile robot, the combinations of the shock absorber and the motion direction conversion mechanism are disposed on the both sides in the front-back direction across the second joint. Further, the repulsive force of the shock absorber disposed on the front side is greater than the repulsive force of the shock absorber disposed on the back side. Therefore, the robot can effectively absorb a large shock generated at the foot during the bracing period.

In the above-described embodiments of the present invention, the shock absorber may comprise at least one of a spring buffer and a dashpot. For example, the shock absorber may include a spring-damper assembly. With this additional feature, the characteristics of the shock absorber such as elasticity or viscosity may be set at a desired value without changing the stroke of the motion direction conversion mechanism or the shock absorber provided in the foot, by appropriately selecting elements of the spring-damper assembly (of the spring buffer and/or the dashpot). Hereupon, the shock absorber or spring-damper assembly may be comprised of a damper and a spring provided around the damper, or a hermetically-sealed damper and a fluid contained in the damper. In cases where a fluid is used, the kind of fluid may be selected appropriately to thereby set a viscosity resistance at a predetermined value. In a case where a magneto rheological fluid is used, a magnetic flux may be changed to change the viscosity resistance. In a case where an electro rheological fluid is used, an electric field may be changed to change the viscosity resistance. An orifice may be provided on a piston of a damper, or a bypass with a flow control valve disposed parallel to a cylinder of a damper. An air-filled space or an elastic member and a fluid may be provided in a cylinder of a damper to control a change in pressure in the cylinder.

The above shock absorber (e.g., comprised of a spring-damper assembly) may further comprise a displacement sensor configured to detect a reaction force acting on the foot flat portion from a ground surface on which the ground contact end of the foot is put. In cases where the shock absorber comprises a dashpot, the above displacement sensor may for example be disposed in a guide position of the piston rod of the dashpot. The displacement sensor may be a magnetic sensor or the like configured to measure the displacement of the piston rod relative to a cylinder of the dashpot. With these features implemented as above, the displacement sensor may also serve as, and thus makes it possible to dispense with, a sensor for detecting a reaction force acting on the foot flat portion, which would be provided in the foot (e.g., at the movable portion).

In the above-described embodiments of the present invention, the foot flat portion may comprise an attenuating member disposed at a surface thereof opposite the movable portion, and configured to attenuate an impact caused by a contact of the movable portion.

With this additional feature, when the stroke (displacement) in the first direction (compressing direction) of the movable portion is relatively small, the spring modulus of the foot can be lowered in comparison with the case without such an attenuating member. In the leg type mobile robot, typically, the stroke (displacement) in the first direction (compressing direction) of the movable portion is relatively small when the foot is landed on the ground (during the landing period). In order to reduce the impact made during the landing period, the smaller spring modulus may be preferable. Accordingly, the leg type mobile robot in which the foot flat portion includes such an attenuating member as described above may be configured to effectively absorb the shock during the landing period.

According to the present invention, when the leg type mobile robot walks or runs, a reaction force received when the foot steps on the ground changes nonlinearly with respect to the displacement in the compressing direction, and thus the stroke in the compressing direction becomes smaller, so that the vertical dimension of the foot may be made smaller and the high locomotive stability may be ensured.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIG. 16 is a schematic diagram for explaining shock absorption in the foot of the bipedal mobile robot according to the third embodiment.

DETAILED DESCRIPTION OF THE EXEMPLARY EMBODIMENTS

A detailed description will be given of exemplary embodiments of the present invention, as implemented in the form of a leg type mobile robot, with reference to the drawings. The following exemplified embodiments relate to an autonomously locomotive bipedal mobile robot to which features of the leg type mobile robot consistent with the present invention are applied by way of example.

First Embodiment

[Bipedal Mobile Robot]

Figure 1:
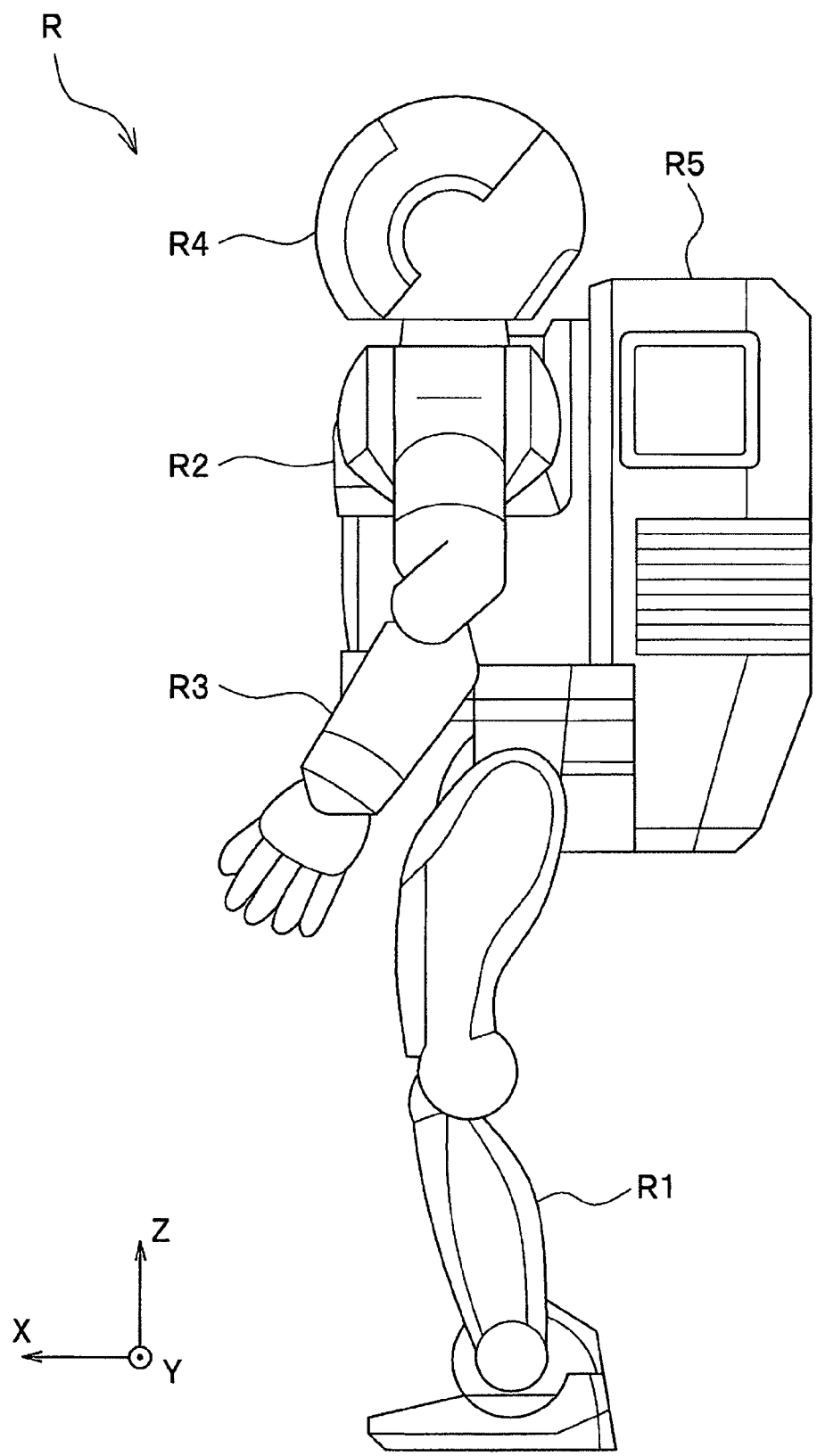
FIG. 1 is a schematic side elevation of a bipedal mobile robot according to a first embodiment of the present invention.

Referring now to FIG. 1, a bipedal mobile robot according to a first embodiment of the present invention will be described. The front-back direction, right-left direction and vertical direction of the bipedal mobile robot are represented by X-axis (the front side of robot R is designated as front or normal direction), Y-axis (the left side of the robot R is designated as normal direction) and Z-axis (the upper side of robot R is designated as normal direction), respectively. Expressions for the position and direction or the like of the bipedal mobile robot are described on the basis of a state where the bipedal mobile robot takes an upright standing posture.

As shown in FIG. 1, a bipedal mobile robot (hereinafter referred to simply as 'robot') R stands and autonomously moves (walks, runs, or otherwise) using two legs R1 (only one leg is shown) in the same manner as a human. The bipedal mobile robot R in the present embodiment includes a body R2, two arms R3 (only one arm is shown), and a head R4. The robot R further includes a controller mount unit R5 for controlling the operation of the legs R1, the body R2, the arms R3 and the head R4, toting it on its back (at the back of the body R2). For more details, see JP 2001-62760 A (corresponding to U.S. Pat. No. 6,401,846 B1, the disclosure of which is incorporated by reference in its entirety), for example.

[Joint Structure of Leg]

Figure 2:
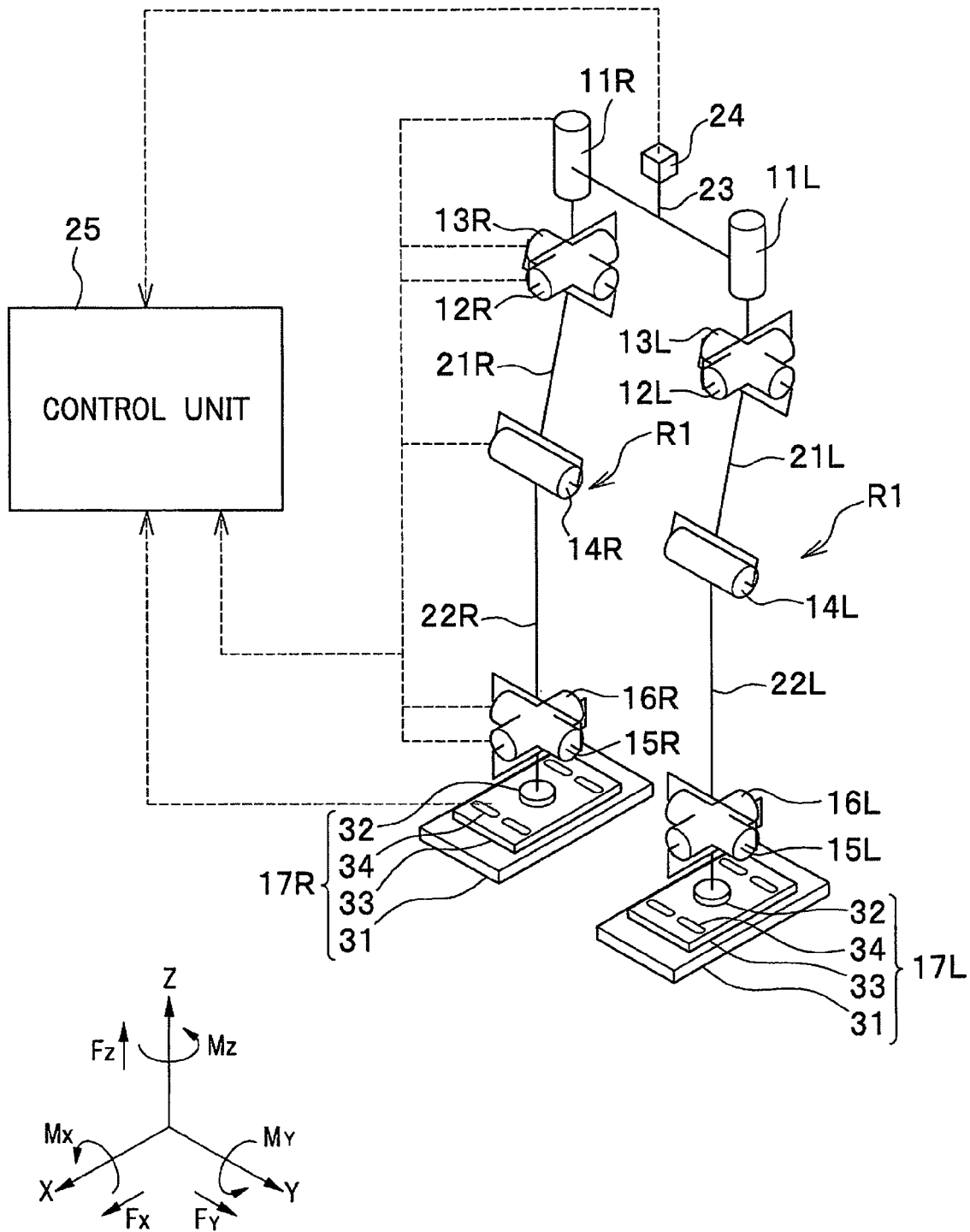
FIG. 2 is a schematic diagram of a joint structure of a leg shown in FIG. 1.

A joint structure of the leg R1 of the robot R is described with reference to FIG. 2. As shown in FIG. 2, the robot R is provided with right and left legs R1 having six joints 11R (11L) to 16R (16L), respectively (the right side is denoted by R, and the left side is denoted by L; the same applies to the following description). The right and left twelve joints are composed of hip joints 11R and 11L for rotating the legs R1 (around the Z-axis) provided at a hip, hip joints 12R and 12L around a roll axis (X-axis) of the hip, hip joints 13R and 13L around a pitch axis (Y-axis) of the hip, knee joints 14R and 14L around a pitch axis (Y-axis) of a knee, ankle joints 15R and 15L around a pitch axis (Y-axis) of an ankle, and ankle joints 16R and 16L around a roll axis (X-axis) of the ankle. Feet 17R and 17L are attached to the lower ends of the legs R1.

That is, the leg R1 is provided with the hip joints 11R(L), 12R(L) and 13R(L), the knee joint 14R(L) and the ankle joints 15R(L) and 16R(L). The hip joints 11R(L) to 13R(L) and the knee joint 14R(L) are connected by a thigh link 21R(L), and the knee joint 14R(L) and the ankle joint 15R(L) and 16R(L) are connected by a shank link 22R(L). Electric motors for driving the joints 11R(L) to 16R(L) are each provided with a rotary encoder (not shown) for measuring the amount of rotation of each joint. This arrangement imparts the total twelve degrees of freedom to the right and left feet of the legs R. The hip joints 11R(L) to 13R(L) are an example of the "first joint", and the ankle joints 15R(L) and 16R(L) are an example of the "second joint" as used in the appended claims.

The leg R1 is connected to the body R2 (see FIG. 1) via the hip joints 11R(L) to 13R(L). In FIG. 2, a connection portion between the leg R1 and the body R2 is shown as an body link 23 for the sake of simplicity. An inclination sensor 24 is installed on the body R2, and configured to detect the inclination and angular velocity relative to the direction of the Z-axis (vertical axis) of the body R2.

The foot 17R(L) is provided under the ankle joints 15R(L), 16R(L). The foot 17R(L) includes a foot flat portion 31, a force sensor 32, a sensor mount frame (movable portion) 33, and a combined unit 34 of a motion direction conversion mechanism and a shock absorber. Hereafter, the combined unit 34 of the motion direction conversion mechanism and the shock absorber will be called a shock absorbing assembly 34. Among these parts of the foot 17R(L), the force sensor 32 is a six-axis force sensor configured to detect six components out of external forces acting on the robot R, i.e., three components Fx, Fy, Fz of a floor reaction force acting on the robot R in three directions from the floor surface, and three components Mx, My, Mz of the moment in three directions. For these purposes, several parts of the force sensor 32 are accommodated in a housing and unitized into a single module. The floor reaction force, moment, inclination and angular velocity detected and transduced into signals by the force sensor 32, inclination sensor 24 and the like, which signals are transmitted through a harness to a control unit 25 and utilized therein for control of the posture, motion and the like of the robot R. The control unit 25 is provided in the controller mount unit R5 (see FIG. 1), and configured to calculate joint actuation control value based upon the detection signals received and other data stored in a memory (not shown), thereby actuating the twelve joints at appropriate angles during walking, to impart a desired integral motion to the leg R1 and the foot 17 so that the robot R walks freely in a three-dimensional space.

[Foot]

Figure 3:
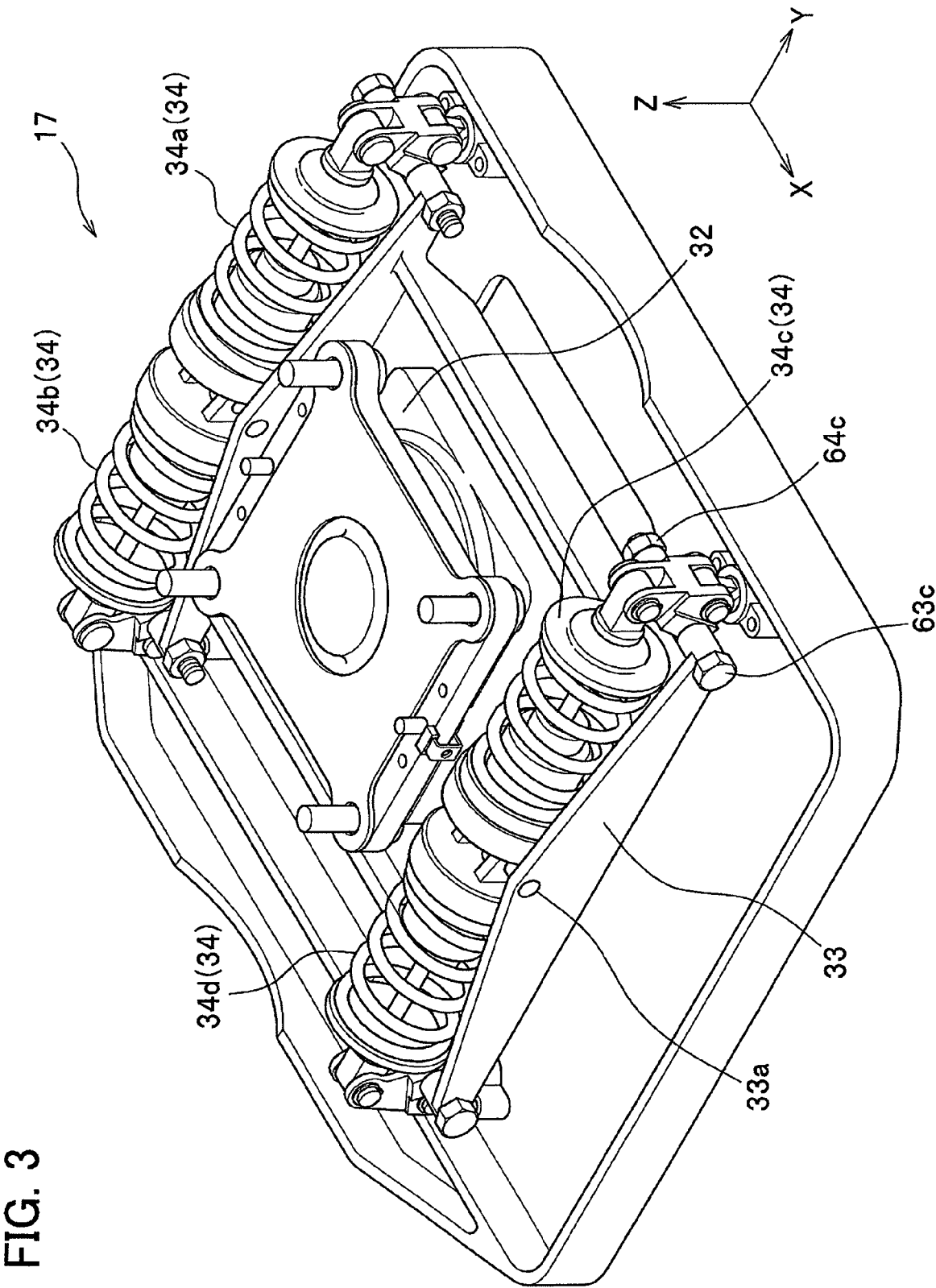
FIG. 3 is a schematic perspective view of a foot of the bipedal mobile robot according to the first embodiment of the present invention.
Figure 4:
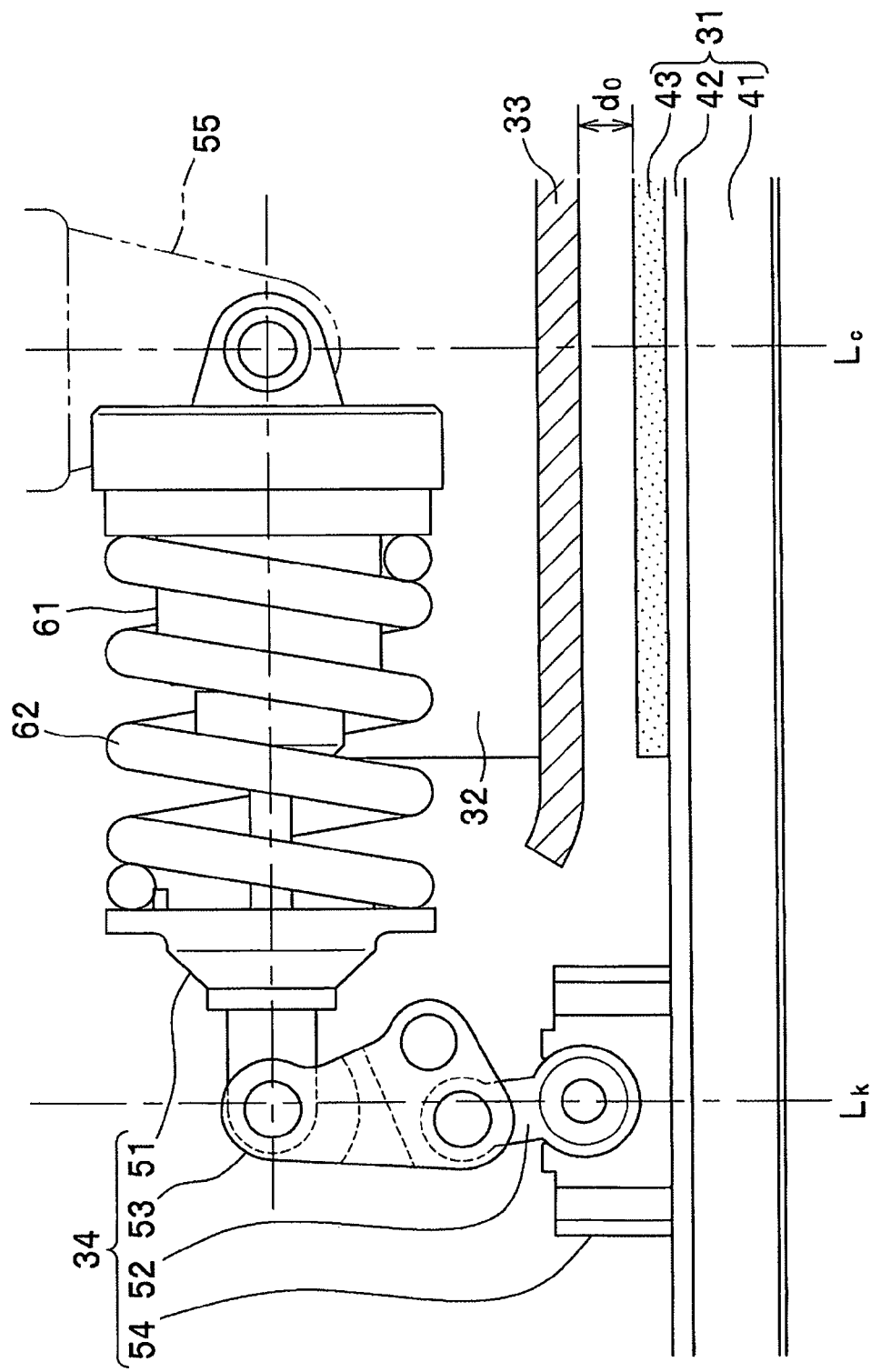
FIG. 4 is a schematic diagram of a shock absorbing assembly shown in FIG. 3.

The next discussion will be directed to the parts other than the force sensor 32, i.e., the foot flat portion 31, sensor mount frame (movable portion) 33, and shock absorbing assembly 34, with reference made to FIGS. 3 to 6 (and to FIG. 2 where appropriate). Here, FIG. 3 shows an exemplified arrangement of the foot 17R in detail. FIG. 4 shows a left half of a front elevation and partial cross section of the right foot 17R as viewed through the sensor mount frame 33 of the foot 17R from the front or normal direction of the X-axis). It is to be understood that FIGS. 3 and 4 are shown in a partially simplified manner with an exterior portion of the robot R of FIG. 1 removed where appropriate, for convenience of explanation. The left foot 17L and the right foot 17R are symmetrically configured, and thus reference character 17 without R or L affixed thereto will be used hereinafter to designate the foot if no particular need arises. In FIGS. 3 and 4, R and L are omitted.

<Foot Flat Portion>

The foot flat portion 31 is configured to support the self weight of the robot R in cooperation with the shock absorbing assembly 34, and disposed to come in contact with the floor (ground) surface. The foot flat portion 31 as shown in FIG. 4 includes a sole 41, a foot flat body 42 and an attenuating member 43, which are arranged in this sequence from below.

The sole 41 is a member having a nonslip function with which a frictional resistance is produced between the sole and the floor (ground) surface, and is made of rubber, for example. The sole 41 is fixed to the foot flat body 42 by adhesion, welding, screwing, or the like. The bottom surface of the sole 41 constitutes a ground contact end of the foot 17.

The foot flat body 42 to which the sole 41 is fixed is made for example of a metal material (e.g., steel, an aluminum alloy, a magnesium alloy, etc.), carbon, a resin, or the like.

The attenuating member 43 is a member configured to attenuate a shock (impact) on the sensor mount frame 33 to be generated on the stepping motion during a bracing period for which one foot is braced against the ground to lift the other foot. The attenuating member 43 is made for example of foamed plastic, rubber, or the like. In FIG. 3, among the parts of the foot flat portion 31, the sole 41 and the attenuating member 43 are omitted, and the foot flat body 42 only is illustrated.

<Sensor Mount Frame>

The sensor mount frame (movable portion) 33 is connected to ankle joints (second joint) 15, 16, and configured to be movable in a direction perpendicular to the ground contact end of the foot 17 relative to the foot flat portion 31. The sensor mount frame 33 is a mount on which the force sensor 32 is to be mounted, and disposed between the force sensor 32 and the attenuating member 43 of the foot flat portion 31. The sensor mount frame 33 and the force sensor 32 are fastened together by a plurality of bolts. In the present embodiment, the sensor mount frame 33 also serves as a mount on which the shock absorbing assembly 34 is to be mounted. Therefore, as shown in the perspective view of FIG. 3, the sensor mount frame 33 has a central area for fixing the force sensor 32 in the center of its rectangular shape in plan view, and areas for fixing the shock absorbing assembly 34 at front and back sides of the central area. A guide member (not shown) for guiding a vertical movement of the sensor mount frame 33 is provided around the sensor mount frame 33. The sensor mount frame 33 is made up for example of a metal member (e.g., steel, an aluminum alloy, a magnesium alloy, etc.), carbon, a resin, or the like. As shown in FIG. 4, the sensor mount frame 33 is separated a predetermined distance do from the foot flat portion 31 when the robot R stands upright. The height of this clearance (distance) between the sensor mount frame 33 and the foot flat portion 31 changes depending upon the amount of the motion of the foot stepping on the ground imparted according as the robot moves.

<Shock Absorbing Assembly>

The shock absorbing assembly 34 is fixed on the sensor mount frame 33, and configured to absorb a shock received by the robot R during the landing period and the bracing period. In the present embodiment, as shown in the perspective view of FIG. 3, the foot 17 includes four shock absorbing assemblies 34 (34a, 34b, 34c, 34d). In FIG. 4, however, only one shock absorbing assembly 34 (34d) is shown for illustration purposes. The number of the shock absorbing assemblies 34 is not limited to this exemplary embodiment, but may be selectable from any numbers i.e., at least one.

In FIG. 3, two shock absorbing assemblies 34a, 34b are aligned in a single row in the right-left direction of the foot 17 at the back side (reverse direction of X-axis) of the force sensor 32, whereas two shock absorbing assemblies 34c, 34d are aligned in a single row in the right-left direction of the foot 17 at the front side (normal direction of X-axis) of the force sensor 32. That is, a pair of shock absorbing assemblies 34a, 34b and a pair of shock absorbing assemblies 34c, 34d are disposed so that these pairs sandwich the force sensor 32 from the front and back directions.

The pair of shock absorbing assemblies 34a, 34b (or 34c, 34d) aligned in a single row laterally at the back (or front) side of the force sensor 34 are arranged symmetrically with respect to a plane (cross section) containing a center of the ankle joint (second joint) 15, 16 extending in the Z-axis direction (perpendicular to a plane containing the ground contact end of the foot 17), and in the X-axis direction. The center line (ankle joint center line) in this cross section as viewed from the normal direction of the X-axis is denoted by reference character L, in FIG. 4.

The shock absorbing assembly 34, as shown in FIG. 4, includes a shock absorber 51, a spherical shaft (link member) 52, a bell crank 53 and a spherical bearing 54. In this example, the spherical shaft 52, bell crank 53 and spherical bearing 54 are assembled together to form a motion direction conversion mechanism.

<Shock Absorber>

Figure 5:
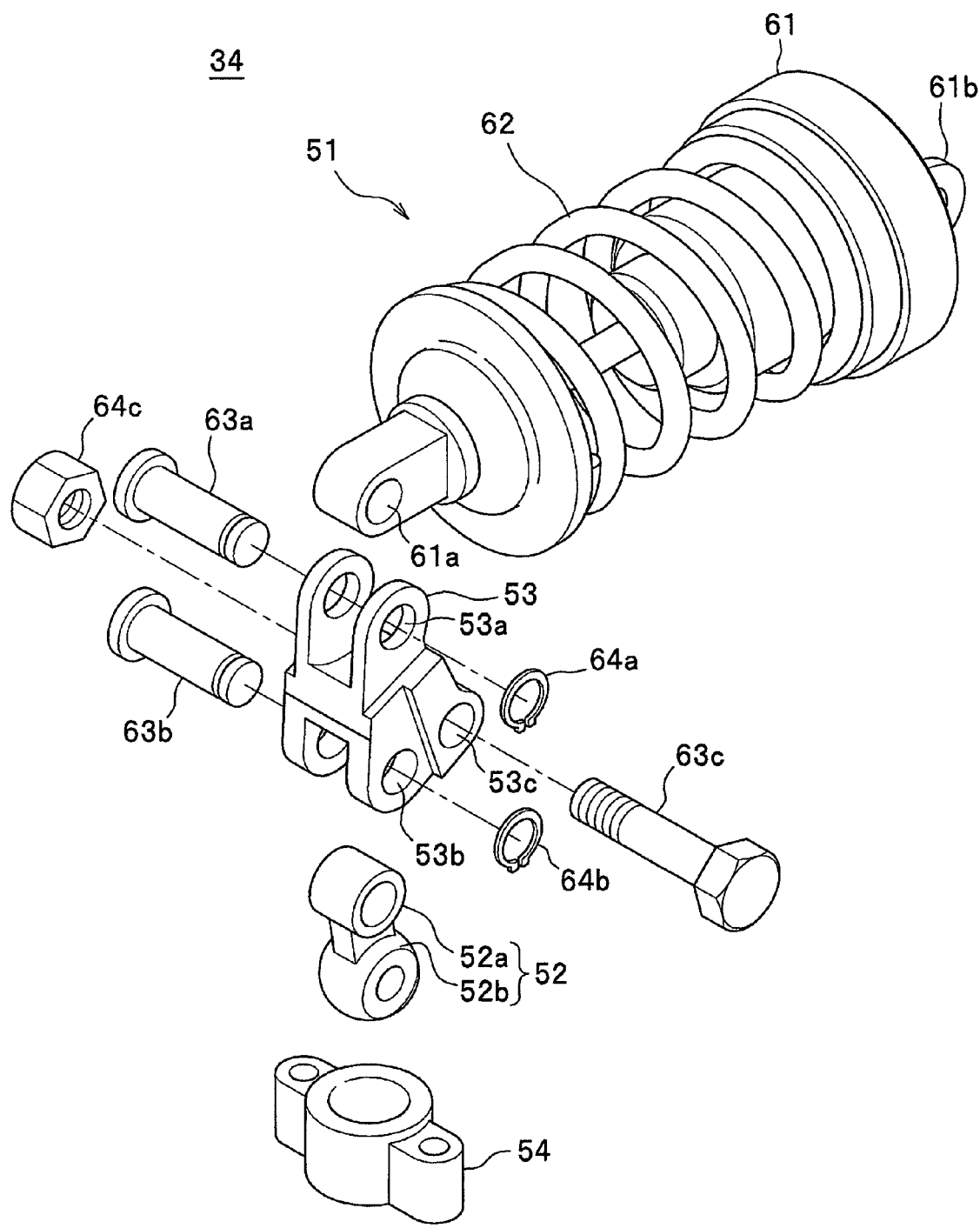
FIG. 5 is a schematic exploded perspective view of the shock absorbing assembly shown in FIG. 3.

The shock absorber 51, which is disposed in a direction parallel to the foot flat portion 31, includes first and second end portions allowed to move closer to or away from each other in the expanding/contracting direction of the shock absorber 51, and the first end portion of the shock absorber 51 is joined to the sensor mount frame 33. In the present embodiment, the shock absorber 51 exhibits a compressive or tensile strength or a viscosity resistance which changes nonlinearly with respect to the displacement (in the direction of compression) of the sensor mount frame 33. The shock absorber 51 includes a damper (dashpot) 61 in which a fluid is hermetically sealed and a spring (spring buffer) 62 disposed around the damper 61. As shown in FIG. 5, the damper 61 includes a piston, of which a direction of displacement is parallel to the foot flat portion 31. The damper 61 has a tip-end side shaft hole 61a provided at a tip end portion of the damper 61, and a bell crank 53 is swingably attached thereto by fitting a first movable shaft 63a into the tip-end side shaft hole 61a of the damper 61 and first shaft holes 53a of the bell crank 53 which are fastened to the first movable shaft 63a with a snap ring 64a. A base end portion 61b of the damper 61 is supported by a pin at an upper shaft hole 33a (see FIG. 3) of the sensor mount frame 33 so that the damper 61 is swingable about the pin relative to the sensor mount frame 33. The base end portion 61b of the damper 61 is connected to an ankle joint link member 55 which is indicated by a two-dot chain line in FIG. 4.

Figure 6:
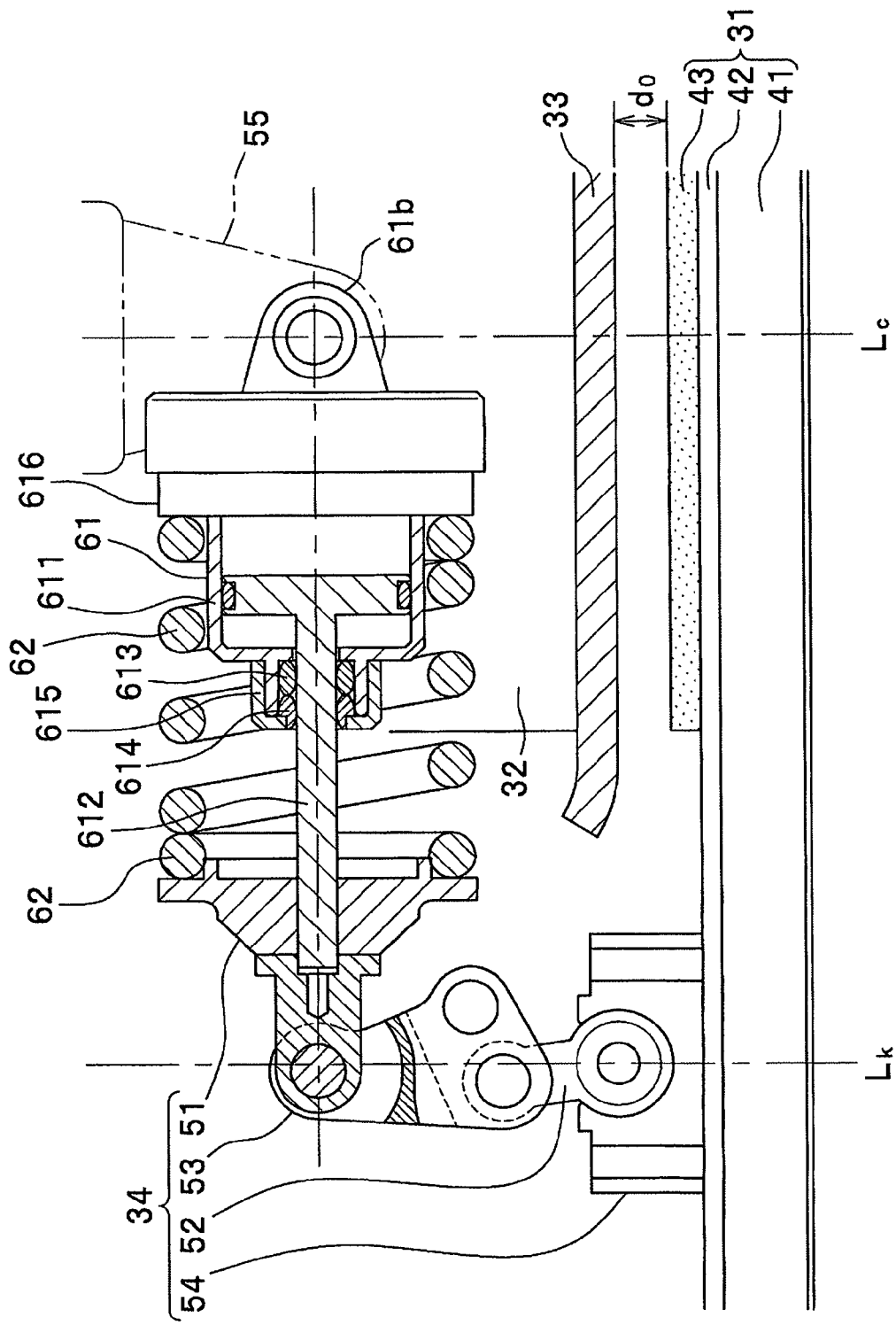
FIG. 6 is a cross section of part of the shock absorbing assembly for schematically illustrating the inside of a dashpot shown in FIG. 5.

To be more specific, the damper 61 includes a piston rod 612 to which the piston configured to reciprocate inside a cylinder 611 is connected, as shown in FIG. 6. The piston rod 612 incorporates a magnetic scale. The damper 61 further includes, inside a cap 615, a seal disposed between the cylinder 611 and the piston rod 612, and a displacement sensor 614 disposed near the seal 613. The displacement sensor 614 is configured to detect (measure) the displacement of the piston rod 612, and to output the detected displacement to the control unit 25 (see FIG. 2). The displacement sensor also serves as a guide of the piston rod 612. A spacer 616 is provided on an outer circumference of the cylinder 611 and serves as a support of the spring 62 on a side nearer to the base end portion 61b of the damper 61.

The fluid hermetically sealed in the damper 61 is selected among those of which the viscosity resistance changes nonlinearly with respect to the displacement of the damper 61. For example, silicon oil or a magneto rheological fluid may be used therefor.

In the present embodiment, the spring 62 is comprised of a coil spring made of spring steel or the like, helically coiled around the damper 61, and the both ends thereof are caulked so that the spring 62 can withstand the tensile load. The spring 62 is not limited to the coil spring, but may be comprised of a volute spring, a Belleville spring or the like.

The spring 62 may be a linear spring in which case a type or Reynolds number of the fluid for use in the damper 61 may be selected appropriately; alternatively, the spring 62 may be a variable rate or nonlinear spring having a nonlinear characteristic.

<Spherical Shaft>

The spherical shaft (link member) 52 is swingably joined at its base end to the foot flat portion 31 through the spherical bearing 54. A second movable shaft 63b is fitted into a connection portion 52a of the spherical shaft 52 and a second shaft hole 53b of the bell crank 53 which are fastened to the second movable shaft 63b with a snap ring 64b. In FIG. 4, the center line in the Y-axis direction of the spherical bearing 54 is denoted by $L_k$.

<Bell Crank>

The bell crank 53 is swingably joined to the connection portion (tip end) 52a of the spherical shaft 52 and to the second end portion of the shock absorber 51, respectively. The bell crank 53 is supported on a side bottom edge portion of the sensor mount frame 33 through a third movable shaft 63c which is different from the first movable shaft 63a joined to the damper 61 of the shock absorber 51, and which is different from the second movable shaft 63b joined to the connection portion 52a of the spherical shaft 52. That is, as shown in FIGS. 3 and 5, the third movable shaft 63c is inserted through the end portion of the sensor mount frame 33 into a third shaft hole 53c of the bell crank 53, and fixed with a nut 64c.

<Set Value of Shock Absorbing Assembly>

Figure 7:
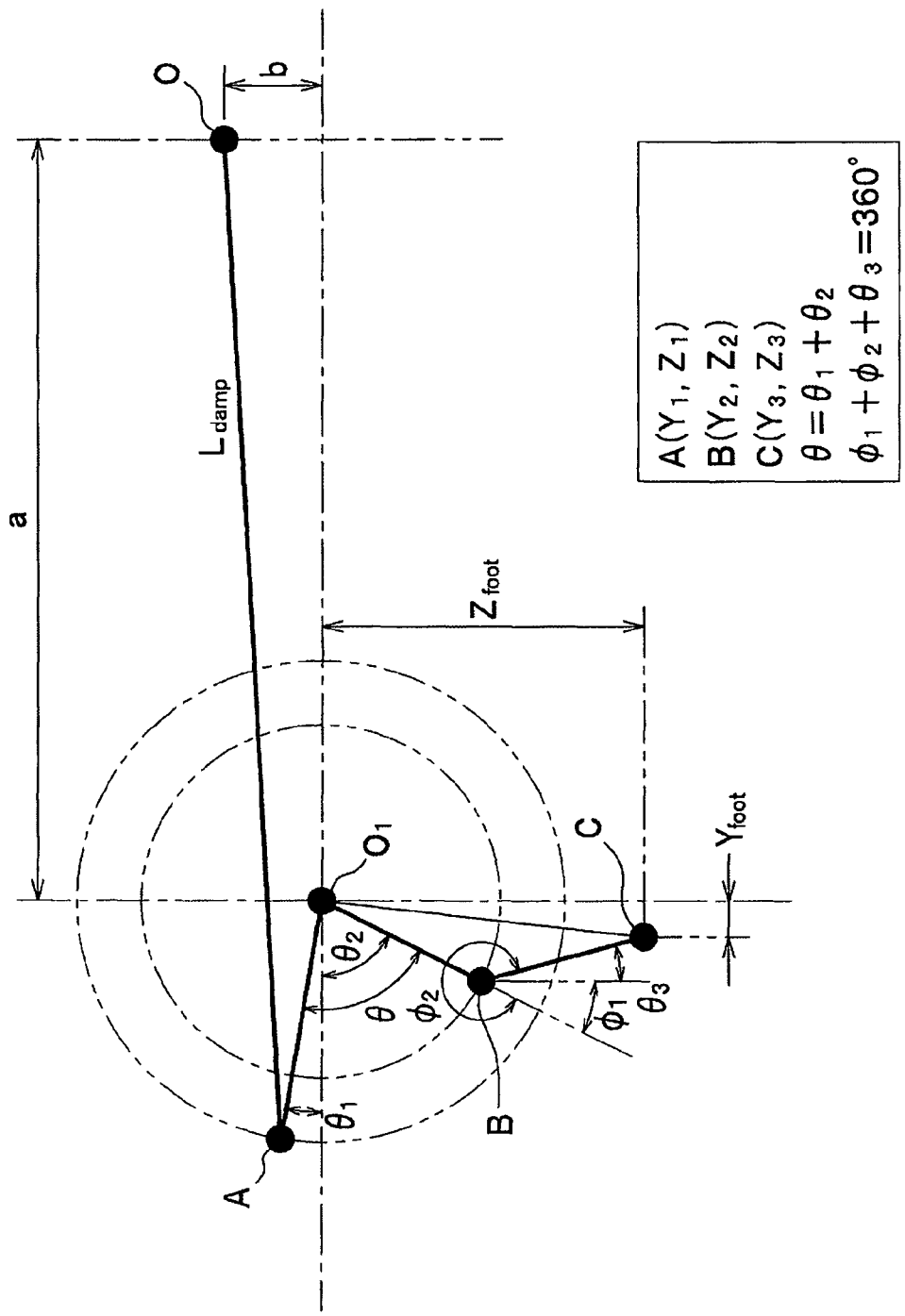
FIG. 7 is a schematic diagram of the shock absorbing assembly shown in FIG. 3 for explaining a structure thereof.

Set values of the shock absorbing assembly 34 will now be described with reference made to FIG. 7 (and to FIGS. 3 through 5 where appropriate). In FIG. 7, which is a schematic diagram showing a structure of the shock absorbing assembly of FIG. 3, the rotation shafts or shaft holes provided in the shock absorbing assembly 34 as shown in FIG. 4 are represented by point O, point $O_1$, point A ($Y_1$, $Z_1$), point B ($Y_2$, $Z_2$), and point C ($Y_3$, $Z_3$). Designation of coordinate values of the point A, point B and point C will be omitted hereinafter.

In FIG. 7, the point O represents a position of the shaft hole of the base end portion 61b of the damper 61 (or the upper shaft hole 33a of the sensor mount frame 33). The point O moves upward or downward according as the sensor mount frame 33 moves upward or downward. The point $O_1$ represents a position of the third shaft hole 53c of the bell crank 53 (or the third movable shaft 63c or the shaft hole in the side bottom edge portion of the sensor mount frame 33). The point $O_1$ moves upward or downward according as the sensor mount frame 33 moves upward or downward. In other words, the point O moves upward or downward in synchronization with the motion of the point O. The points $O_1$ and O are separate at a distance 'a' in the direction Y, and separate at a distance 'b' in the direction Z. The distances 'a', 'b' are fixed values.

The point A represents a position of the first shaft hole 53a of the bell crank 53 (or the tip-end side shaft hole 61a of the damper 61). The point A turns around the point $O_1$ together with a radius vector of a segment A-$O_1$ having a fixed length ($L_1$, for example) as the bell crank 53 rotates about the point $O_1$. Moreover, the point A moves upward or downward as the bell crank 53 fixed on the sensor mount frame 33 moves upward or downward. In other words, the point A makes a complex movement with a linear motion in the direction Z and a rotational motion combined together. The length of the segment A-O represents the length $L_{damp}$ that is a distance from the first and second end portions of the damper 61. The length $L_{damp}$ changes with the expanding/contracting motion of the piston of the damper 61 and the spring 62.

The point B represents a position of the second shaft hole 53*b* of the bell crank 53 (or the shaft hole of the connection portion 52*a* of the spherical shaft 52). The point B turns around the point $O_1$ together with a radius vector of a segment B-$O_1$ having a fixed length ($L_2$, for example) as the bell crank 53 rotates about the point On. Moreover the point B moves upward or downward as the bell crank 53 fixed on the sensor mount frame 33 moves upward or downward. Furthermore, since the segment B-C has a fixed length ($L_3$, for example), the point B makes a complex movement with a linear motion in the direction Z, a rotational motion of the bell crank 53, and a rotational motion of the spherical shaft 52 combined together.

The point C represents a position of the base end of the spherical shaft 52 supported on the spherical bearing 54. The point C is fixed to the foot flat portion 31 through the spherical bearing 54. In other words, in FIG. 7, the point C is a fixed point. These point C and point $O_1$ are separate from each other at a distance '$Y_{foot}$' in the direction Y, and at a distance '$Z_{foot}$' in the direction Z. However, since the point C is a fixed point, the distances '$Y_{foot}$' and '$Z_{foot}$' are variables which are subject to change. In other words, the segment C-$O_1$ has a variable length.

The point A, point B and point C have an angular relationship as follows. Assuming that a variable angle representative of an angle formed between the segment A-$O_1$ having a fixed length and a center line passing through the point $O_1$ and parallel to the Y-axis is '$\theta_1$', and a variable angle representative of an angle formed between the segment B-$O_1$ having a fixed length and a center line passing through the point $O_1$ and parallel to the Y-axis is '$\theta_2$', the total angle '$\theta$' (i.e., $\theta_1+\theta_2$) is a fixed angle $\angle AOB$. It is also assumed that a variable angle representative of an angle formed between the segment B-C having a fixed length and a straight line passing through the point B and parallel to the Z-axis is '$\theta_3$', and a variable angle representative of an angle formed between the segment B-$O_1$ having a fixed length and a center line passing through the point $O_1$ and parallel to the Z-axis is '$\phi_4$'. It is assumed that an angle resulting from subtraction of the total value of '$\theta_3$' and '$\phi_1$' from 360 degrees is '$\phi_2$'.

[Motion of Bipedal Mobile Robot]

Figure 8:
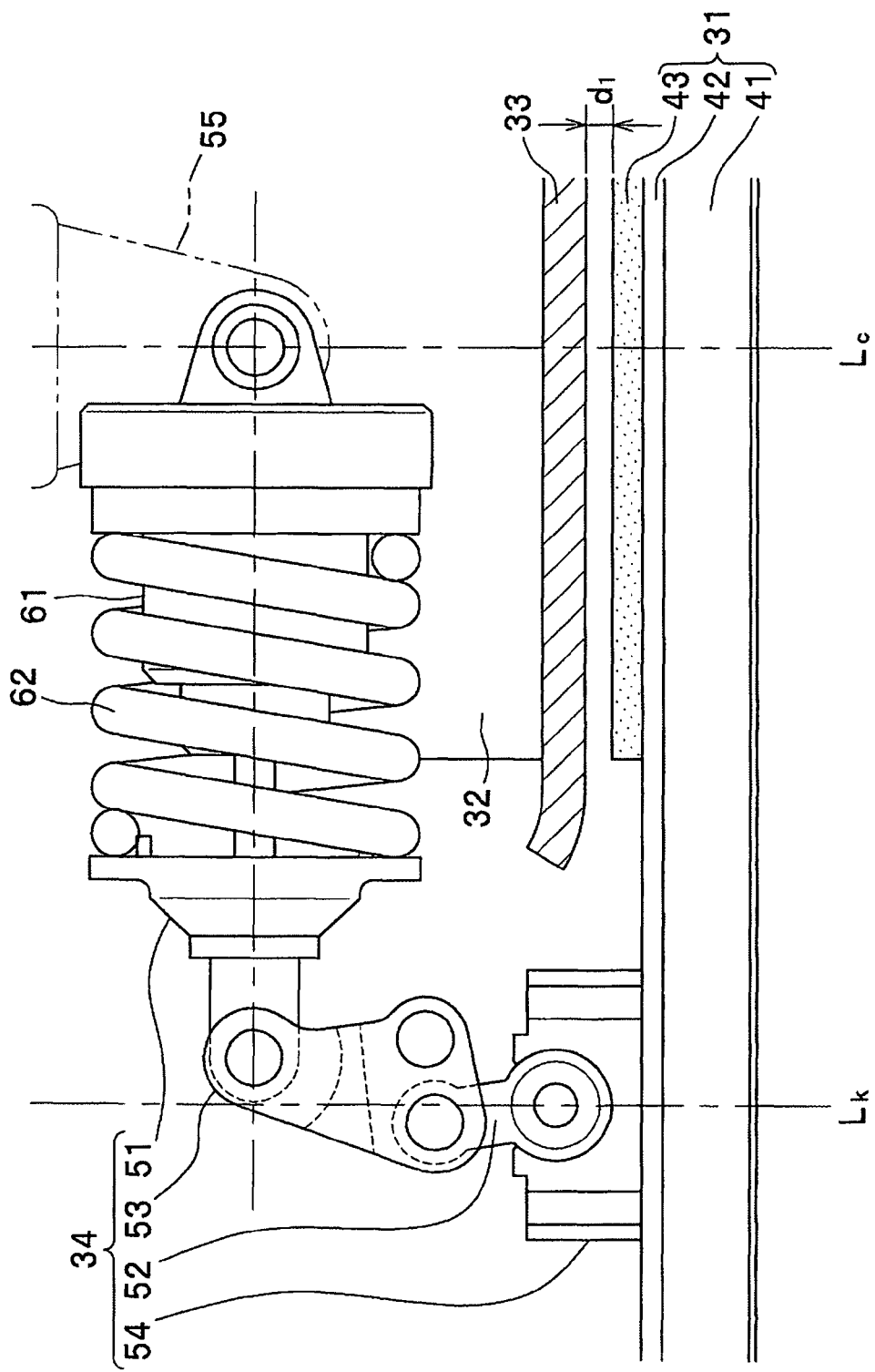
FIG. 8 is a schematic diagram of the shock absorbing assembly shown in FIG. 4 for explaining an operation thereof, by illustrating an initial state of operation in which the robot having stood upright on its two feet starts shifting its self weight to one foot to press the one foot on the ground.
Figure 9:
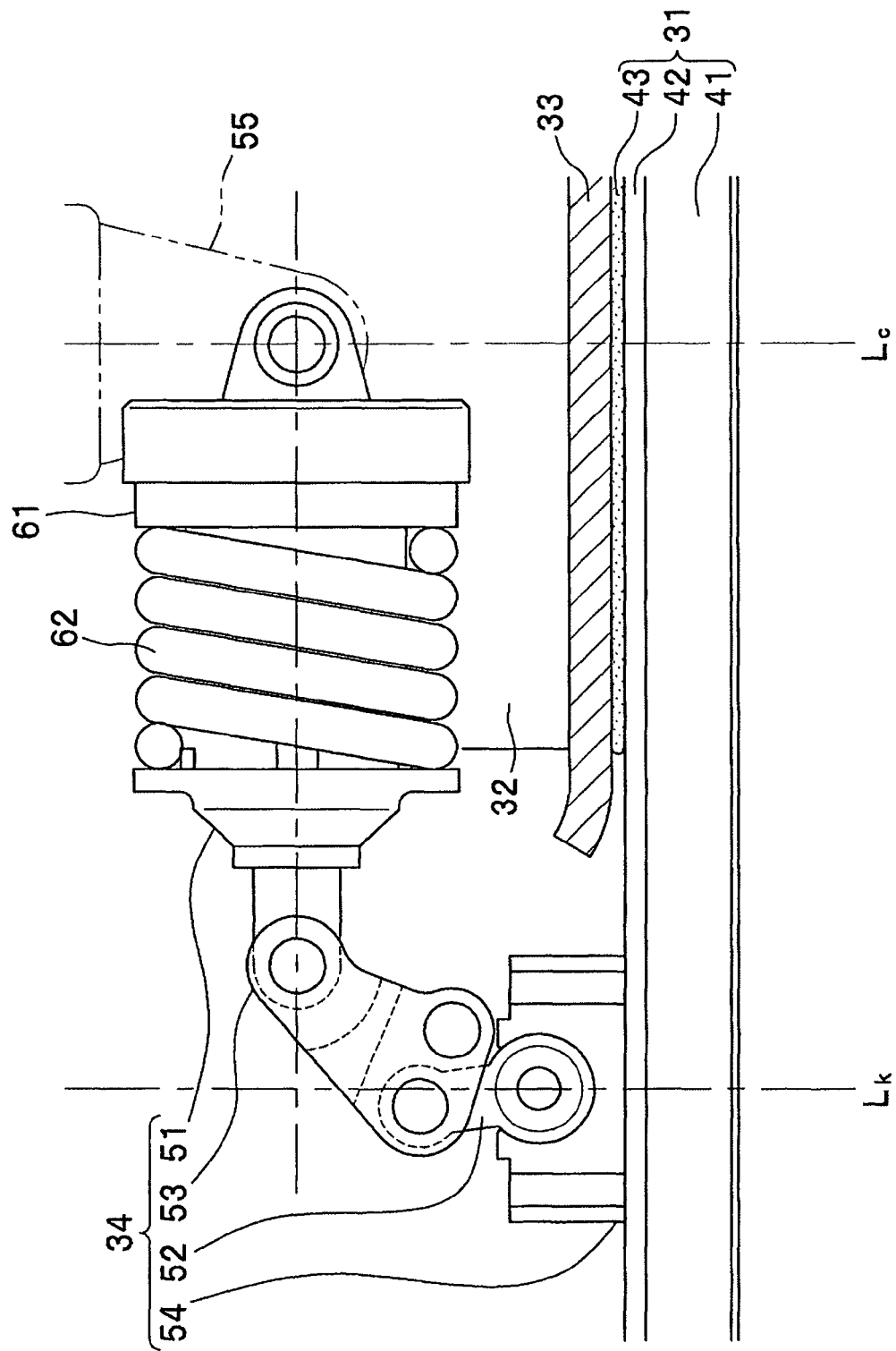
FIG. 9 is another schematic diagram of the shock absorbing assembly shown in FIG. 4 for explaining an operation thereof, by illustrating a state of operation in which the robot presses the foot stepped on the ground down to its utmost extent.
Figure 10:
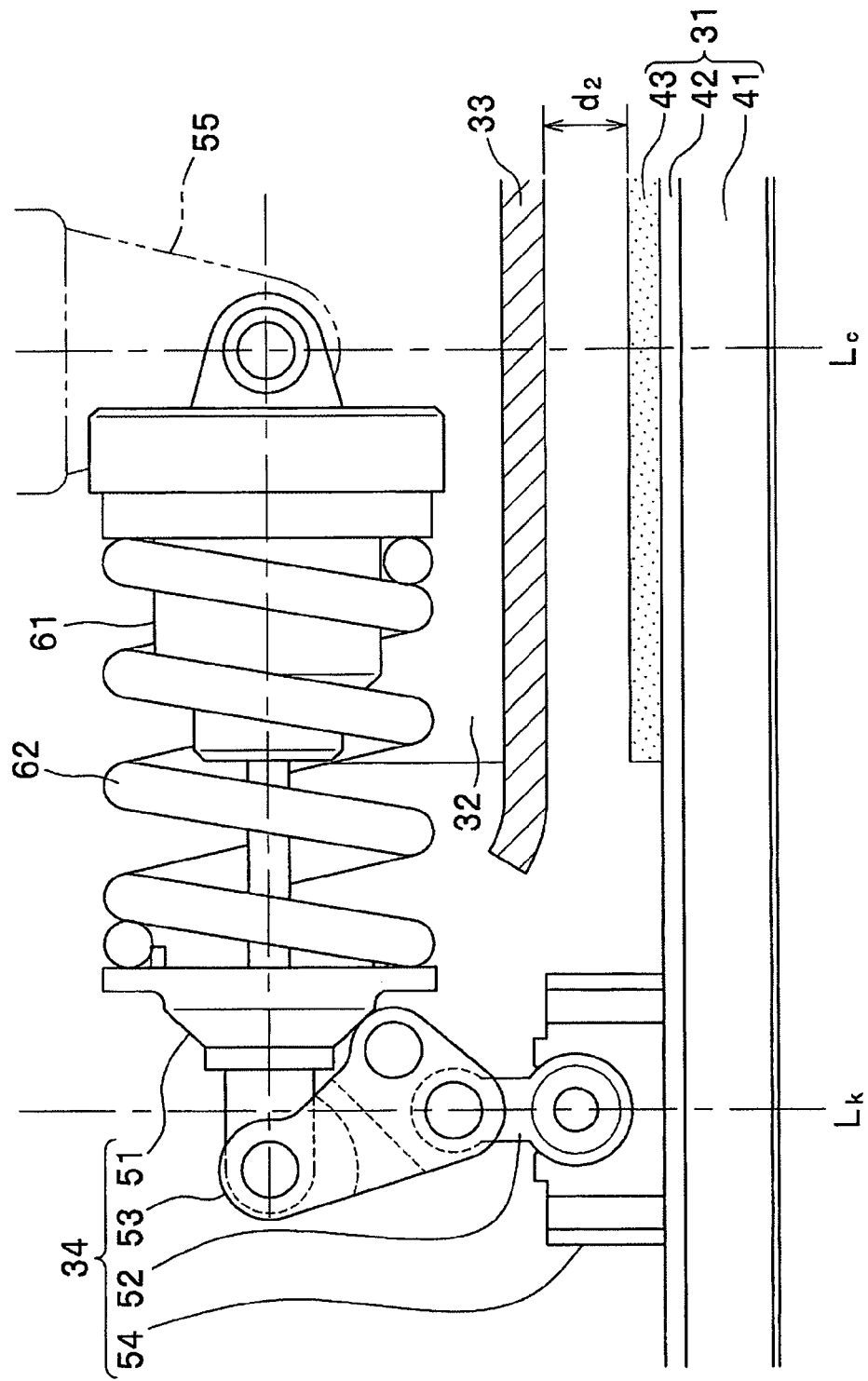
FIG. 10 is another schematic diagram of the shock absorbing assembly shown in FIG. 4 for explaining an operation thereof, by illustrating a state of operation in which the foot on the ground is lifted up.

A description will be given of a motion of the bipedal mobile robot according to the first embodiment, particularly of an operation of the shock absorbing assembly of the foot, with reference made to FIGS. 8 through 10 (and to FIGS. 3 through 7 where appropriate). Here, FIGS. 8 through 10 are diagrams illustrating exemplary operations of the shock absorbing assembly shown in FIG. 4. In FIG. 8, an initial state of operation is illustrated in which the robot having stood upright on its two feet starts shifting its self weight to one foot to step (press) the one foot on the ground. Similarly, illustrated in FIG. 9 is a state of operation in which the robot presses the foot stepped on the ground down to its utmost extent, and illustrated in FIG. 10 is a state of operation in which the foot on the ground is lifted up.

<Motion of Robot Starting Stepping Foot on Ground>

When FIGS. 4 and 8 are compared, the difference in the Z-axis direction is as follows.

As shown in FIG. 4, when the robot R is standing upright, the sensor mount frame 33 is separated from the foot flat portion 31 at a predetermined distance $d_0$. On the other hand, as shown in FIG. 8, when the robot R starts stepping (pressing) its foot on the ground, the sensor mount frame 33 lowers in the foot 17, and becomes separate from the foot flat portion 31 at a predetermined distance $d_1$ (<$d_0$). That is, the clearance between the sensor mount frame 33 and the foot flat portion 31 becomes narrow.

When FIGS. 4 and 8 are compared, the change of motion in the Y-axis direction from the state shown in FIG. 4 to the state shown in FIG. 8 is as follows. The bell crank 53 turns clockwise (right-handedly) about the third movable shaft 63*c* (or the third shaft hole 53*c*), the piston of the damper 61 and the spring of the shock absorber 51 contracts. That is, the length of the damper 61 becomes short.

When FIGS. 8 and 9 are compared, the change of motion in the Z-axis direction from the state shown in FIG. 8 to the state shown in FIG. 9 is as follows. As shown in FIG. 9, when the robot R presses the foot 17 stepped on the ground down to its utmost extent, the sensor mount frame 33 is further lowered, and comes in close contact with the foot flat portion 31 so that the attenuating member 43 of the foot flat portion 31 is compressed. In this way, the shock against the sensor mount frame 33 is reduced by the attenuating member 43.

When FIGS. 8 and 9 are compared, the change of motion in the Y-axis direction from the state shown in FIG. 8 to the state shown in FIG. 9 is as follows. The bell crank 53 further turns clockwise (right-handedly) about the third movable shaft 63*c*, and the piston of the damper 61 and the spring 63 of the shock absorber 51 becomes contracted to its utmost extent. At this time, the third movable shaft 63*c* is lowered as the sensor mount frame 33 moves down. In other words, the bell crank 53 also turns clockwise (right-handedly) about the second movable shaft 63*b*. In this way, when the robot R presses the foot 17 stepped on the ground down from the state in which the robot R is standing upright, the motion of the sensor mount frame 33 lowering in the Z-axis direction is converted into the motion of the shock absorber 51 contracting in the Y-axis direction.

<Motion of Robot Lifting Up Foot>

When FIGS. 4 and 10 are compared, the change of motion in the Z-axis direction from the state shown in FIG. 4 to the state shown in FIG. 10 is as follows. As shown in FIG. 10, when the robot R standing upright as shown in FIG. 4 lifts the foot 17 up from the ground, the sensor mount frame 33 is raised in the foot 17, and becomes separate from the foot flat portion 31 at a predetermined distance $d_2$ (>$d_0$). That is, the clearance between the sensor mount frame 33 and the foot flat portion 31 becomes wide.

When FIGS. 4 and 10 are compared, the change of motion in the Y-axis direction from the state shown in FIG. 4 to the state shown in FIG. 10 is as follows. The bell crank 53 further turns counterclockwise (left-handedly) about the third movable shaft 63*c*, and the piston of the damper 61 and the spring 63 of the shock absorber 51 becomes expanded. At this time, the third movable shaft 63*c* is raised as the sensor mount frame 33 moves up. Thus, the bell crank 53 turns counterclockwise (left-handedly) about the second movable shaft 63*b*, and the spherical shaft 52 turns clockwise (right-handedly) according as the third movable shaft 63*c* is raised. In this way, when the robot R standing upright lifts the foot 17 up from the ground, the motion of the sensor mount frame 33 moving up in the Z-axis direction is converted into the motion of the shock absorber expanding in the Y-axis direction.

<Motion of Robot Shifting into Upright Position>

When the state shown in FIG. 4 is realized, i.e., the foot 17 is put on the ground, the spherical shaft 52 fixed in a predetermined position, the shock absorber 51 lowered to a predetermined position together with the sensor mount frame 33, and the bell crank 53 turned in synchronism with the shock absorber 51 support the self weight of the robot R, which is, to be more specific, the total load derived from the weight of an upper structure disposed above the shock absorbing assembly 34 of the robot R, and the shock absorber 51 which elastically deforms as the bell crank 53 turns absorbs the shock or impact upon landing on the ground. Therefore, with a simple structure as discussed above can support the self weight of the robot R and absorb the shock from the floor reaction force. The shock absorbing assembly 34 exhibits a high shock absorbing capability in comparison with the elastic member (e.g., made of rubber), and thus the locomotive speed of the robot R (walking or running) may be increased.

[Characteristics of Shock Absorbing Assembly]

Figure 11:
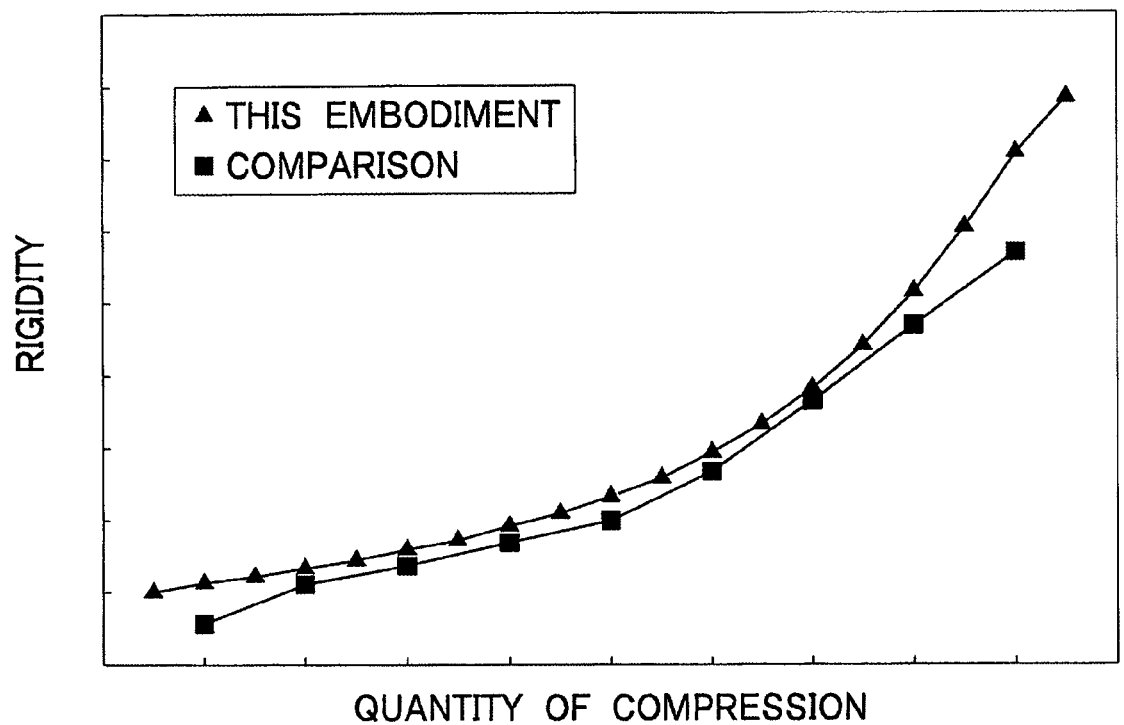
FIG. 11 is a graph showing a relationship between the quantity of compression in a direction perpendicular to the ground contact surface of the shock absorbing assembly and the rigidity of the shock absorbing assembly against the compression.
Figure 12:
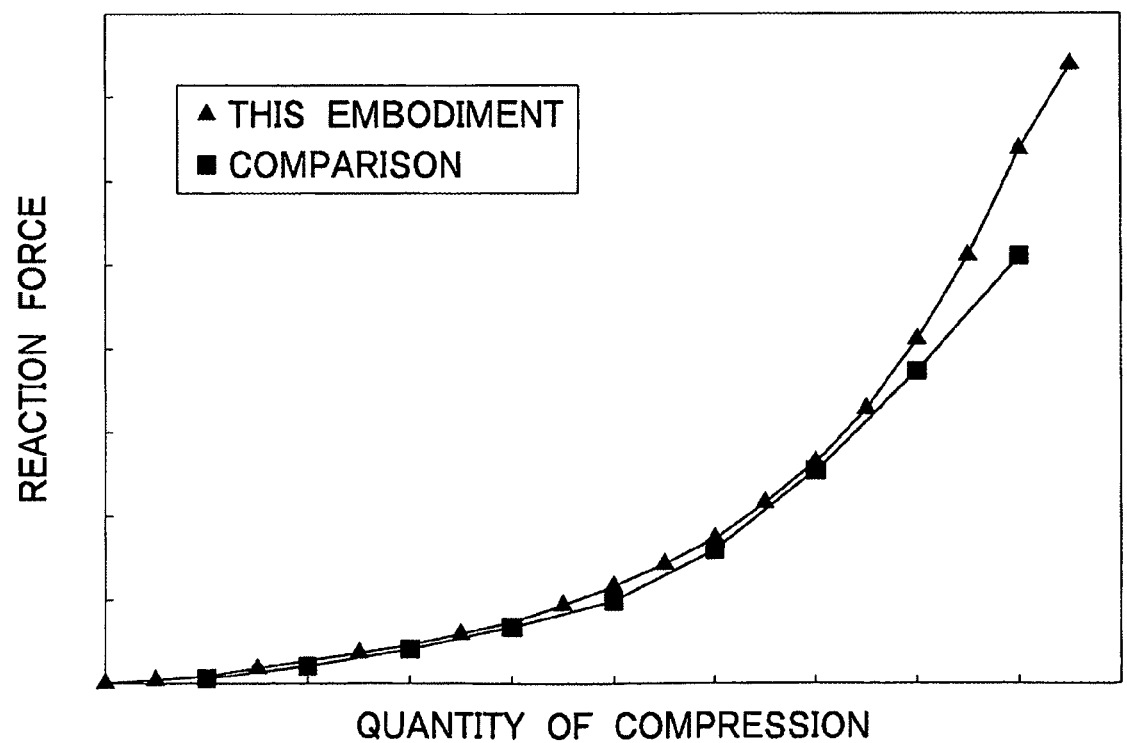
FIG. 12 is a graph showing a relationship between the quantity of compression in the direction perpendicular to the ground contact surface of the shock absorbing assembly and the reaction force from the ground contact surface.

The next discussion focuses on the characteristics of the shock absorbing assembly 34, with reference to FIGS. 11 and 12. Shown in FIG. 11 is a graph of the quantity of compression in a direction perpendicular to the ground contact surface of the shock absorbing assembly versus the rigidity of the shock absorbing assembly against the compression. Shown in FIG. 12 is a graph of the quantity of compression in the direction perpendicular to the ground contact surface of the shock absorbing assembly versus the reaction force from the ground contact surface. Here, the rigidity of the shock absorbing assembly refers to a physical quantity indicative of a property of the shock absorbing assembly that withstands the compressive stress, which would cause deformation therein, in a direction perpendicular to the ground contact surface (Z-axis direction), and for example corresponds to the rigidity of the elastic member made of rubber. This rigidity is represented by a unit [N/mm], for example.

In the graphs shown in FIGS. 11 and 12, the characteristics of a conventional elastic member made of rubber (for comparison) and the characteristics of the shock absorbing assembly 34 of the robot R according to the present embodiment are shown.

As shown in FIG. 11, the shock absorbing assembly 34 has a characteristic such that as the quantity of compression increases, the rigidity increases nonlinearly. To be more specific, when the quantity of compression is relatively small, the rigidity of the shock absorbing assembly 34 is substantially the same as the rigidity of the elastic member made of rubber; however, when the quantity of compression is relatively large, a change in the rigidity of the shock absorbing assembly 34 becomes larger than a change in the rigidity of the elastic member made of rubber. In other words, the shock absorbing assembly 34 may be designed to exhibit a greater spring modulus when the robot R is standing upright (during the stable bracing period) in comparison with the spring modulus when the robot R puts the foot 17 on the ground (during the landing period). Furthermore, the shock absorbing assembly 34 may be designed to exhibit a greater spring modulus when the robot R pressing the foot 17 stepped on the ground down in comparison with the spring modulus when the robot R is standing upright (during the stable bracing period).

Accordingly, as shown in FIG. 12, the shock absorbing assembly 34 exhibits a reaction force from the ground contact surface increased nonlinearly according as the quantity of compression increases. To be more specific, when the quantity of compression is relatively small, the reaction force from the ground contact surface when the shock absorbing assembly 34 used is substantially the same as the reaction force from the ground contact surface when the elastic member made of rubber is used; however, when the quantity of compression is relatively large, the rate of change in the reaction force from the ground contact surface when the shock absorbing assembly 34 is used becomes larger than the rate of change in the reaction force from the ground contact surface when the elastic member made of rubber is used.

Moreover, the elastic member made of rubber is designed to deform, when compressed, to produce a small displacement (stroke) in the Z-axis direction. In contrast, the shock absorbing assembly 34 may increase such a small displacement in the Z-axis direction by converting it to a great displacement in the Y-axis direction. Incidentally, the foot 17 of the robot R is typically designed to accommodate a variety of devices other than the force sensor 32. In cases where a conventional-type elastic member made of rubber is used to provide shock-absorbing functionality, a greater stroke adaptable to the recent trends toward increased locomotion speed of the robot R could be achieved, but by the sacrifice of the space in the foot 17 in the Z-axis direction which could otherwise be utilized effectively, and the good exterior appearance would be impaired. In contrast, the shock absorbing assembly 34 included in the robot R according to the present embodiment may have a greater stroke in the Y-axis direction in a manner conformable to the natural contour of the foot 17. Accordingly, the shock absorbing assembly 34 may be adaptable to a desired, greater stroke ensured in the Y-axis direction, and may be given a greater durability to withstand the greater reaction force resulting from the increased locomotion speeds of the robot R. Furthermore, with this shock absorbing assembly 34, the space in the foot 17 may be utilized effectively without impairing the exterior appearance of the foot 17.

According to the present embodiment, the robot R is configured to convert the motion of the sensor mount frame 33 in the Z-axis direction to the motion of the shock absorber 51 in the Y-axis direction by the action of the rotational motion of the bell crank 53 and other motions in the shock absorbing assembly 34 provided in the foot 17. Therefore, the characteristics of the reaction force produced by the motion of the foot 17 stepping on the ground with its ground contact surface may be rendered nonlinear. Consequently, the robot R may absorb a shock or impact with a relatively small reaction force during the landing period, and may have a relatively great reaction force so as to ensure the locomotive stability during the bracing period. Moreover, the robot R according to the present embodiment has the advantage, particularly in an application with increased locomotion speeds, over a conventional robot with an elastic member made of rubber incorporated therein, in that the shock absorber 51 is disposed horizontally (parallel to the foot flat portion 31) so that a stroke (for displacement) may be designed to be greater, and the space for accommodation in the foot 17 may be provided with increased ease.

Second Embodiment

A bipedal mobile robot according to a second embodiment is similar to the first embodiment which has been described with reference to FIGS. 1 through 4, except that a four-bar linkage is used in the shock absorbing assembly 34 of the foot 17. Therefore, the same elements will be designated by the same reference characters, and a duplicate description thereof will be omitted. An alternative shock absorbing assembly in the foot will hereafter be described with reference made to FIG. 13 (to FIGS. 3 and 4 where appropriate).

Figure 13:
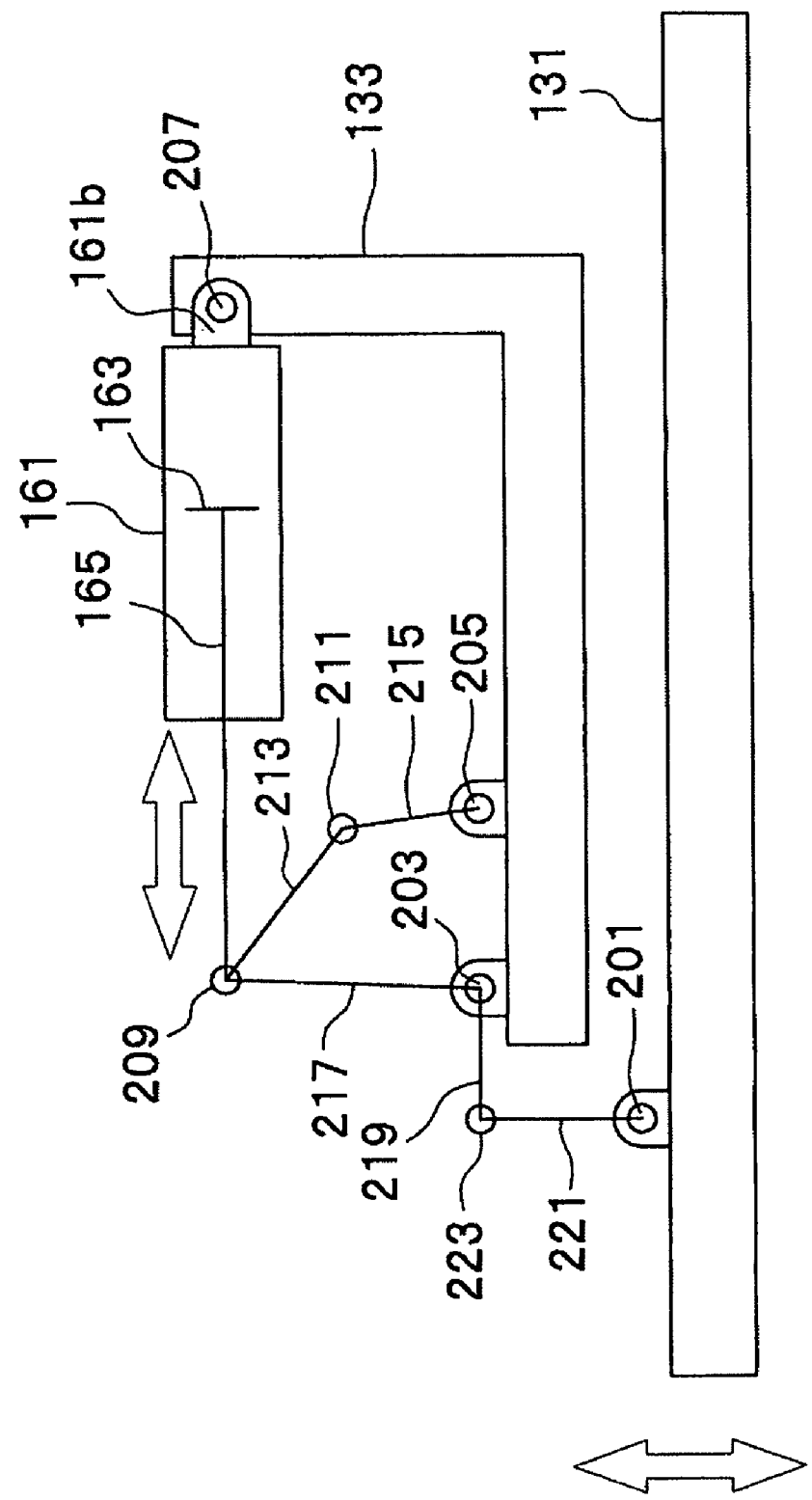
FIG. 13 is a schematic diagram of a foot of a bipedal mobile robot according to a second embodiment of the present invention.

FIG. 13 schematically shows a foot of a bipedal mobile robot according to the second embodiment. The bipedal mobile robot according to the second embodiment, as in the first embodiment, includes four shock absorbing assemblies (though not all are shown) over the foot flat portion 131 of the foot 17. FIG. 13 shows a left-side half of the foot 17 (17R) of the robot R standing upright, as viewed from the normal direction of X-axis (i.e., right foot is viewed from the front), as in FIG. 4. In FIG. 13, only one shock absorbing assembly fixed on the sensor mount frame 133 is shown. In order to show the four-bar linkage clearly, the other elements of the foot 17 will be illustrated in a simplified manner in FIG. 13. Although the other elements of the foot 17 are thus designated by other reference characters, the arrangement of them should be understood in the same manner as shown in FIG. 4. For example, the foot flat portion 131, to be more specific, includes a sole 41, a foot flat body 42 and an attenuating member 43, though not shown. The sensor mount frame 133 is shown as having an inverted L-shaped cross section for clearly illustrating the four-bar linkage; however, the sensor mount frame 133 may be shown in a right triangle. The same will apply to the following description.

The damper 161 is disposed horizontally, i.e., parallel to the foot flat portion 131, with its base end (first end portion) 161b joined with the sensor mount frame 133. The damper 161 includes a piston 163 disposed inside the cylinder, joined to a first end (right end) of a piston rod 165 and configured to be movable horizontally (parallel to the foot flat portion 131). A spring 62 is provided around the damper 161, and a fluid is hermetically sealed in the damper 161.

The foot 17 shown in FIG. 13 includes a plurality of rotation shafts (hereinafter referred to as 'shafts') and shaft holes, and each shaft has its axis disposed parallel to the X-axis direction (direction perpendicular to the drawing sheet in FIG. 13). A shaft 201 is rotatably fixed at the upper surface of the foot flat portion 131, and moves up and down together with the foot flat portion 131. Shafts 203 and 205 are rotatably fixed at the upper surface of the bottom portion of the sensor mount frame 133 in positions separate from each other at a predetermined distance. A shaft 207 is joined to the base end 161b of the damper 161, rotatably fixed at the upper portion of the sensor mount frame 133, and moves up and down together with the foot flat portion 131.

A shaft 209 is joined to a second end (left end) of the piston rod 165 of the damper 161. The shaft 209 is joined to a shaft 211 through a link 213, and to the shaft 203 through a link 217. The shaft 211 is joined to the shaft 209 through the link 213, and to the shaft 205 through a link 215. A link 219 has its one end (right end) joined to the shaft 203, and the other end (left end) joined to a shaft 223. The links 219 and 217 form a fixed angle. A link 221 has one end (upper end) joined to the shaft 223, and the other end (lower end) joined to the shaft 201. The link 221 is comprised of the spherical shaft 52, for example.

At the upper surface of the bottom portion of the sensor mount frame 133, a four-bar link as a motion direction conversion mechanism is formed. Since the angle formed between the link 219 and the link 217 is fixed relative to each other, these two links 219 and 217 may be substituted with a single integrally-formed member such as a bell crank.

<Motion of Robot Starting Stepping Foot on Ground>

When the robot R having stood upright on its two feet starts stepping (pressing) one foot 17 on the ground, the sensor mount frame 133 lowers in the foot 17, and a clearance between the sensor mount frame 133 and the foot flat portion 131 becomes narrow. Then, the links 217, 219 turn clockwise (right-handedly) about the shaft 203, and the shafts 209, 211 turn around in the YZ plane. As a result, the piston rod 165 of the damper 161 presses the piston 163. That is, the length of the damper 161 becomes short. In this way, when the robot R having stood upright on its two feet steps (presses) the foot 17 on the ground, the motion of the sensor mount frame 133 lowering in the Z-axis direction is converted into the motion of the damper 161 compressing in the Y-axis direction, and into the rotational motion of the shaft 211 pivotally supporting the links 213, 215.

When the robot R having stood upright lifts the foot 17 up from the ground, the sensor mount frame 133 is raised in the foot 17, and the clearance between the sensor mount frame 133 and the foot flat portion 131 becomes wide. Then, the links 217, 219 turn counterclockwise (left-handedly) about the shaft 203, and the shafts 209, 211 turn around in the YZ plane. At this time, the shaft 203 is raised as the sensor mount frame 133 moves up, according to which the link 221 turns clockwise (right-handedly). As a result, the piston rod 165 of the damper 161 is pulled by the shaft 209. That is, the length of the damper 161 becomes long. In this way, when the robot R having stood upright lifts the foot 17 up from the ground, the motion of the sensor mount frame 133 moving up in the Z-axis direction is converted into the motion of the damper 161 expanding in the Y-axis direction, and into the rotational motion of the shaft 211 pivotally supporting the links 213, 215.

According to the present embodiment, the robot R is provided with a four-bar linkage, and thus may convert the motion of the sensor mount frame 133 in the Z-axis direction to the motion of the damper 161 expanding/contracting in the Y-axis direction, and to the rotational motion of the four-bar linkage. Accordingly, the robot R may absorb the reaction force produced in the foot 17 at the ground contact surface in response to the stroke in the Z-axis direction, as energy of the rotational motion of the four-bar linkage. As a result, an impact or shock to be absorbed by the damper 161 may be reduced.

Third Embodiment

A bipedal mobile robot according to a third embodiment is similar to the first embodiment except that, in the foot 17 shown in FIG. 3, shock absorbing ability of the two shock absorbing assemblies 34c, 34d is different from shock absorbing ability of the two shock absorbing assemblies 34a, 34b, which are disposed in parallel across the force sensor 32 in a front-back direction thereof (in the X-axis direction). Therefore, the same elements will be designated by the same reference characters, and a duplicate description thereof will be omitted. The front-back direction (the X-axis direction) of the force sensor 32 is identical to the front-back direction of the foot flat portion 31 across the ankle joints (second joints) 15, 16. Shock absorbing ability of the shock absorbing assembly 34 varies according to a characteristic of the shock absorber 51 (see FIG. 5). In this embodiment, a characteristic of the shock absorber 51 is represented by repulsive force of the shock absorber 51 to repel external force in an expanding/contracting direction thereof. It is to be noted that, in the front-back direction of the foot flat portion 31, a front direction is a traveling direction of the robot R during which a heel thereof lands first. A back direction is a traveling direction of the robot R during which a tiptoe thereof lands first.

Respective shock absorbers 51 of the shock absorbing assemblies 34a, 34b, 34c, 34d are configured such that repulsive forces thereof to repel external force in the expanding/contracting direction are adjustable to each other based on floor reaction force applied to the respective shock absorbers 51. For example, the shock absorbers 51 provided nearer to an area in which a stronger floor reaction force is applied to the foot 17 may be set to have a stronger repulsive force. On the other hand, the shock absorbers 51 provided farther to the aforementioned area may be set to have a weaker repulsive force. Further, the area may vary on the foot 17, when the robot R walks or runs. Thus, the robot R may have a table or a map in which information on an order of strength of the repulsive force of the respective shock absorbers 51 according to a distance from the area to each of the shock absorbers 51 is associated with positional information of the area on the foot 17.

The next discussion focuses on a method of making characteristics of the shock absorbers 51 different according to whether the shock absorbers 51 are disposed on a front side or a back side of the foot flat portion 31 across the ankle joints 15, 16. The discussion is made with reference to FIGS. 14A and 14B and FIGS. 15A to 15D, each of which is a schematic view illustrating a configuration example of the damper 61 of the shock absorber 51 (see FIG. 5).

Figure 14A:
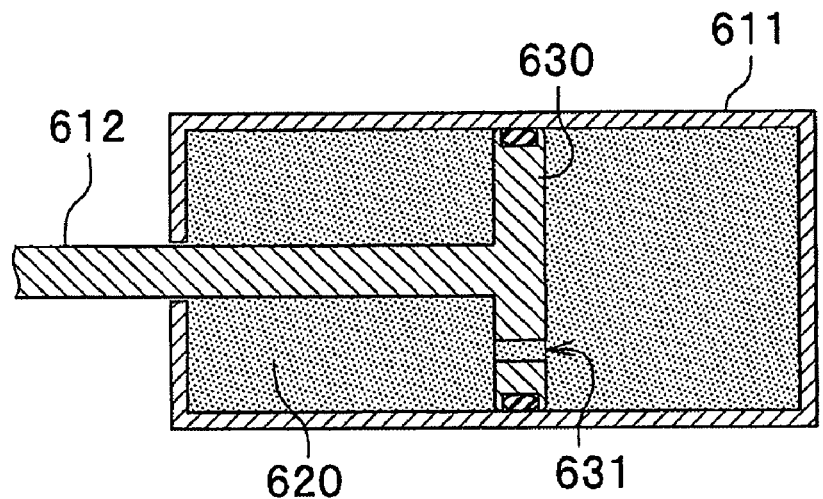
FIGS. 14A and 14B are schematic diagrams each illustrating an example in which one kind of a member is hermetically sealed in a damper of a bipedal mobile robot according to a third embodiment of the present invention.

A damper shown in FIG. 14A has a functional fluid 620 hermetically sealed in the cylinder 611. The functional fluid 620 may include, for example, an electro rheological fluid (ER fluid) or a magneto rheological fluid (MR fluid). The ER fluid is prepared by adding microparticles of an insulating material to silicon oil or the like. The ER fluid is interposed between a pair of electrodes not shown for applying voltage thereto. The voltage-applied ER fluid becomes solidified as a viscosity thereof changes. When voltage between the electrodes is stopped, the ER fluid restores its former state. The MR fluid is prepared by adding microparticles of a ferromagnetic material to silicon oil or the like. Electric field is applied to the MR fluid from an electromagnet not shown. The electric field-applied ER fluid becomes solidified as a viscosity thereof changes. When an application of electric field is stopped, the MR fluid restores its former state. Thus, if the MR fluid is hermetically sealed in a plurality of dampers, a magnetic flux applied to a damper(s) disposed in the front side is made different from a magnetic flux applied to the other damper(s) disposed on the back side so as to make the dampers on the different sides have different viscosity resistances. As a result, characteristics of the shock absorbers 51 on the front side and on the back side can be made different.

The damper shown in FIG. 14A has a removable orifice 631 in a piston 630 at an end of a piston rod 612. The orifice 631 communicates an inner side of the piston 630 (on a side of the piston rod 612) and an outer side of the piston 630 (on a side of a tip of the cylinder 611) and serves as a restriction of the functional fluid 620. A diameter of an orifice 631 in a damper(s) disposed on the front side may be made different from a diameter of an orifice 631 in a damper(s) disposed on the back side. In this way, pressures passing through the orifices 631 in the dampers on the different sides are made different. As a result, characteristics of the shock absorbers 51 on the front side and on the back side can be made different. Further, substantially functional diameters of the orifices 631 may be changed by separately controlling viscosity of the functional fluid 620 filled in different dampers. Note that the repulsive force of the shock absorber 51 includes a force depending on a position of the piston 630 or the orifice 631 and an attenuating force depending on a rate of the piston 630 or a rate of the functional fluid 620 passing through the orifice 631.

Figure 14B:
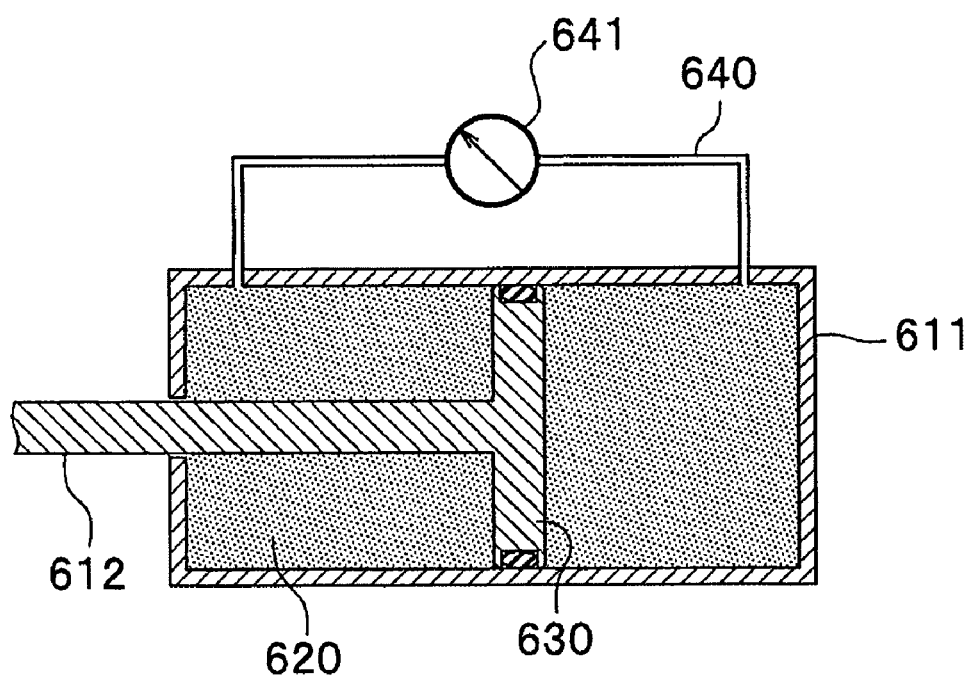

A damper shown in FIG. 14B has the cylinder 611 with the functional fluid 620 hermetically sealed therein, and a bypass 640 provided parallel to the cylinder 611 for communicating between inside and outside of the piston 630. A valve 641 is provided in the bypass 640. The valve 641 may be a needle valve or a servo valve. The valve 641 may be adjusted manually or automatically to make pressure in the bypass 640 in a damper(s) disposed on the front side different from pressure in the bypass 640 in a damper(s) disposed on the backside. That is, the bypass 640 operates similarly to the orifice 631 shown in FIG. 14A. As a result, characteristics of the shock absorbers 51 on the front side and on the back side can be made different.

Figure 15A:
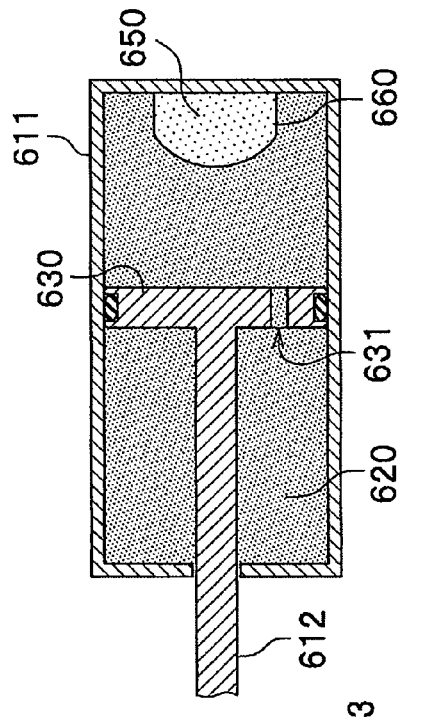
FIGS. 15A, 15B, 15C and 15D are schematic diagrams each illustrating an example in which two kinds of members are hermetically sealed in a damper of a bipedal mobile robot according to the third embodiment.

A damper shown in FIG. 15A has the cylinder 611 with an area in which the functional fluid 620 is hermetically sealed and another area in which air 650 is filled. The damper also has a free piston 651 outside of the piston 630 (on the side of a tip of the cylinder 611). The functional fluid 620 is hermetically sealed inside the piston 630 having the orifice 631 and inside the free piston 651 (on a side of the piston 630). The air 650 is filled outside the free piston 651. The cylinder 611 has an air injection tube 652 outside the free piston 651. A valve 653 is provided in the air injection tube 652. The valve 653 may be a needle valve or a servo valve and controls a flow rate of the air 650 passing through the air injection tube 652. Thus, by adjusting the valve 653, pressure applied to an outside of the free piston 651 in the cylinder 611 in a damper(s) disposed on the front side can be made different from pressure applied to an outside of the free piston 651 in the cylinder 611 in a damper(s) disposed on the backside. As a result, characteristics of the shock absorbers 51 on the front side and on the back side can be made different. In a case where the cylinder 611 has the area in which the air 650 is filled, even if the functional fluid 620 is hardly compressible, the area in which the air 650 is filled can be compressed. This allows compression force applied to the outside of the piston 630 in the cylinder 611 to be greater.

Figure 15B:
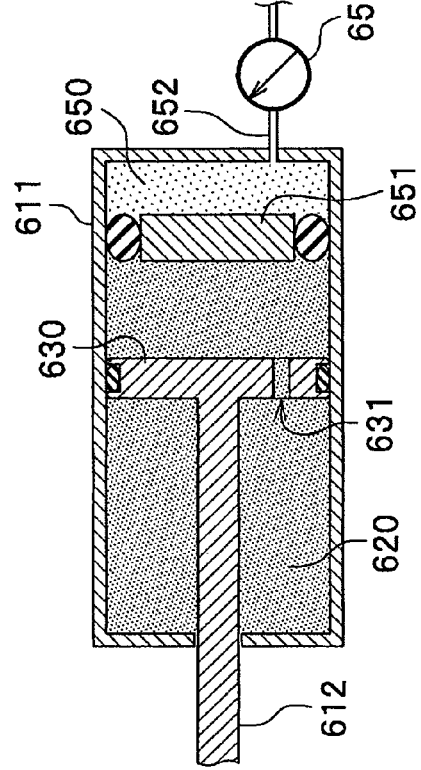

A damper shown in FIG. 15B has an area, on the tip side of the cylinder 611 (outside the piston 630), in which the air 650 is hermetically sealed in advanced using a diaphragm 660 made of an elastic material such as rubber. The area operates similarly to the damper shown in FIG. 15A with a simple configuration.

Figure 15D:
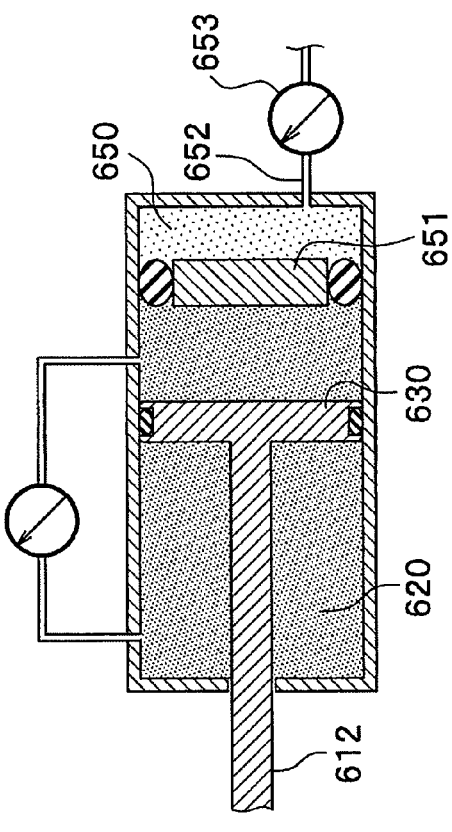
Figure 15C:
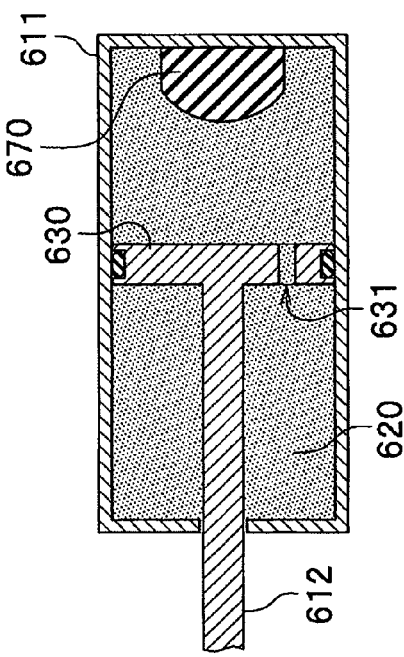

A damper shown in FIG. 15C has an elastic member 670 made of silicon rubber or the like on the tip side of the cylinder 611 (outside the piston 630). The elastic member 670 operates similarly to the damper shown in FIG. 15A with a simple configuration.

A damper shown in FIG. 15D is a combination of the dampers shown in FIG. 14B and FIG. 15A. That is, the orifice 631 of the damper in FIG. 15A is replaced with the bypass 640 and the valve 641 shown in FIG. 14B. This facilitates a fine adjustment of different characteristics of the shock absorbers 51 on the front side and on the back side.

Characteristics of the shock absorbers 51 may be changed by changing pressure on the spring 62 without changing a configuration of the damper 61. For example, heights of the spacers 616 (see FIG. 6) removably attached to the dampers 61 may be made different. The height of the spacer 616 herein is a height of the damper 61 in the expanding/contracting direction.

In this embodiment, repulsive force of the shock absorber 51 on the front side is set to be greater than that on the back side. FIG. 16 is a schematic diagram of the foot 17 shown in FIG. 3 when viewed from a positive direction of technique Z-axis. In FIG. 16, a tiptoe 701 of the foot flat portion 31 is shown on a left side thereof, and a heel 702, on a right side thereof. The foot 17 shown in FIG. 16 has the force sensor 32 fixed to the sensor fixing frame 33 at a center thereof. The center of the sensor fixing frame 33 is aligned with a center of the ankle joints 15, 16. Four shock absorbing assemblies 34a, 34b, 34c, 34d are mounted on the sensor fixing frame 33. Shock absorbing ability of the shock absorbing assemblies 34c, 34d on the foot flat portion 31 on a side nearer to the tiptoe 701 is set to be greater than that of the shock absorbing assemblies 34a, 34b on a side nearer to the heel 702. That is, the repulsive force of the shock absorbers 51 on the side nearer to the tiptoe 701 is set to be greater than that of the shock absorbers 51 on the side nearer to the heel 702. When the robot R travels forward, the heel 702 of the foot 17 first lands on a floor, and then, the tiptoe 701 lands on the floor. Even if the heel 702 and the tiptoe 701 land on the floor at the same time while traveling forward, the heel 702 first leaves off the floor, and then, the tiptoe 701 leaves off the floor. That is, the shock absorbing ability on the side nearer to the tiptoe 701 generated during the bracing period is greater than that on the side nearer to the heel 702 during he landing period.

In the embodiment, as shown in FIG. 16, a distance between the tiptoe 701 of the foot flat portion 31 and the center of the ankle joints 15, 16 (the center of the sensor fixing frame 33) is larger than a distance between the heel 702 of the foot flat portion 31 and the center of the ankle joints 15, 16. That is, a moment generated when the tiptoe 701 leaves off the floor is larger than a moment generated when the heel 702 lands on the floor. Thus the robot R can effectively absorb a shock generated during the bracing period, using the tiptoe 701 side of the foot 17. As a result, characteristics of the shock absorbers 51 on the front side and on the back side can be made different according to a distance p between the tiptoe 701 and a working point on the front side (the shock absorbing assemblies 34c, 34d) and a distance q between the heel 702 and the working point on the back side (the shock absorbing assemblies 34a, 34b).

The characteristics of the shock absorbers 51 on the front side and on the back side may be made identical, if the distances p, q or a size of the foot 17 is set in advance so as to effectively absorb a shock generated at the foot 17 during the bracing period, making use of the tiptoe side. The characteristics may be made different by providing a spring parallel to the motion direction conversion mechanism (a bell crank 53 or a four link mechanism) of the shock absorbing assembly.

In the embodiment, the shock absorbing ability of the shock absorbing assemblies 34c, 34d of the foot 17is set to be greater than that of the shock absorbing assemblies 34a, 34b. That is, the shock absorbing ability on the side nearer to the tiptoe 701 is greater than that on the side nearer to the heel 702. Therefore, the robot R can effectively absorb a shock, making use of the tiptoe side, generated at the foot 17 during the bracing period, during which a load relatively larger than that during the landing period is loaded. The robot R can thus absorb a shock effectively, especially when the robot R is running and the foot 17 is subjected to a large shock.

Figure 17A:
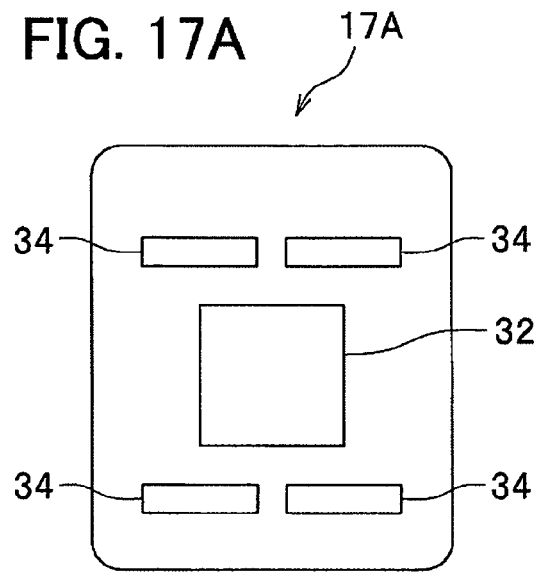
FIGS. 17A, 17B, 17C and 17D are schematic diagrams illustrating examples of arrangements of shock absorbing assemblies.
Figure 17B:
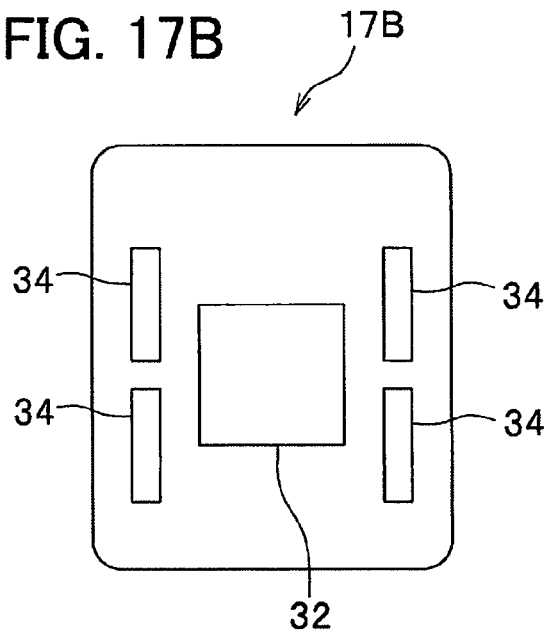
Figure 17C:
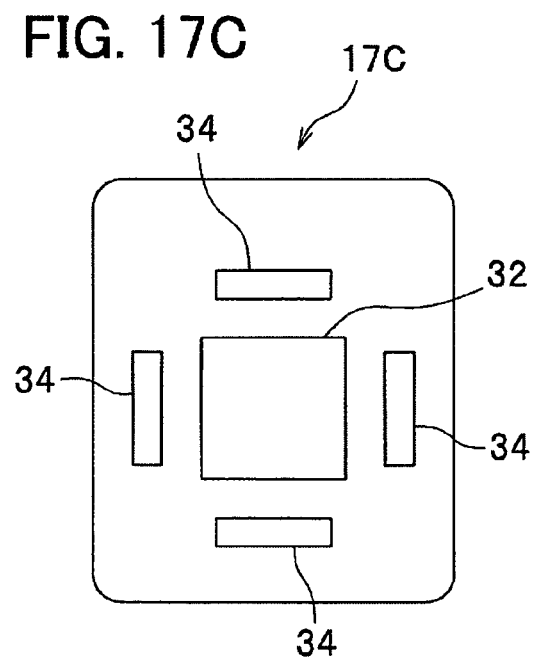
Figure 17D:
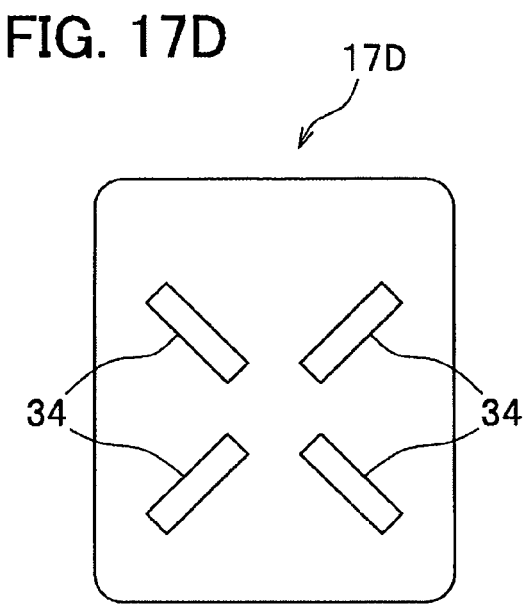

Although some preferred embodiments of the present invention have been described above, the present invention is not limited to these exemplary embodiments. For example, the arrangement of the shock absorbing assemblies 34 in the foot 17 of the robot R is not limited to the above exemplary embodiments. Hereinbelow, a variation of arrangement of the shock absorbing assemblies 34 will be described with reference to FIGS. 17A, 17B, 17C and 17D, which schematically show exemplary arrangements of the shock absorbing assemblies. In FIGS. 17A-17D, four shock absorbing assemblies 34 are provided around the center of the ankle joints (second joint) 15, 16; i.e., the center of the shock absorbing assemblies 34 coincide with the center of the ankle joints 15, 16. A foot 17A, as schematically shown in FIG. 17A, includes shock absorbing assemblies arranged in the same way as in the first embodiment. To be more specific, two pairs of shock absorbing assemblies 34 are disposed symmetrically at the front and back sides of the force sensor 32 in such a manner that the front pair and the back pair of the shock absorbing assemblies 34 and the force sensor 32 sandwiched therebetween are aligned in the x-axis direction. A modified embodiment of the arrangement in FIG. 17A is illustrated in FIG. 17B as a foot 17B in which two pairs of shock absorbing assemblies 34 are disposed symmetrically at the right and left sides of the force sensor 32 in such a manner that the right pair and the left pair of the shock absorbing assemblies 34 and the force sensor 32 sandwiched therebetween are aligned in the y-axis direction. Similarly, in a foot 17C illustrated in FIG. 17C, two shock absorbing assemblies 34 are disposed symmetrically at the front and back sides of the force sensor 32 in such a manner that the front shock absorbing assembly 34 and the back shock absorbing assembly 34 and the force sensor 32 sandwiched therebetween are aligned in the x-axis direction, while the other two shock absorbing assemblies 34 are disposed symmetrically at the right and left sides of the force sensor 32 in such a manner that the right shock absorbing assembly 34 and the left shock absorbing assembly 34 and the force sensor 32 sandwiched therebetween are aligned in the y-axis direction. Similarly, in a foot 17D illustrated in FIG. 17D, four shock absorbing assemblies 34 are disposed radially in such a manner that angles formed between adjacent shock absorbing assemblies 34 are 90 degrees. This foot 17D includes a displacement sensor 614 (see FIG. 6) of the damper 61 of each shock absorbing assembly 34, and the displacement sensor 614 serves the same function as that of the force sensor 32, and thus no force sensor 32 is provided therein. The shock absorbing assemblies 34 may not necessarily be arranged symmetrically with respect to the center of the ankle joints (second joint) 15, 16, but one may prefers to choose such a symmetrical arrangement because this may offer a better balance.

Furthermore, in the first embodiment, the piston rod side end of the shock absorber 51 is joined to the bell crank 53, but the orientation of the shock absorber 51 may be reversed and the cylinder side end of the shock absorber 51 may be joined to the bell crank 53. The illustrated shape of the bell crank 53 is exemplary only, and the shape of the bell crank 53 is not limited to this particular embodiment. Furthermore, the shock absorber 51 includes both of a damper 61 (dashpot with a fluid sealed therein) and a spring 62 (spring buffer), but may include either of the damper 61 or the spring 62.

Furthermore, in the first embodiment, the shock absorber 51 is configured to exhibit the compressive or tensile strength (rigidity) or viscosity resistance changing nonlinearly with respect to the displacement (in the direction of compression) of the sensor mount frame 33, but the present invention is not limited to this particular configuration. That is, the rigidity or viscosity resistance of the shock absorber 51 may be configured to change linearly. In this case, as well, the nonlinear characteristics achieved by the motion direction conversion mechanism, such as a bell crank 53, may be retained. Further, it would be desirable that, among a plurality of the shock absorbers 51, repulsive force of the shock absorber(s) 51 provided on a side of the foot 17 which leaves off a floor later is greater than repulsive force of the shock absorber(s) 51 provided on the other side of the foot 17 which leaves off a floor first. The repulsive forces of the shock absorbers 51 on the two sides may be adjusted not for a forward travel of the robot R but for a backward travel thereof.

It is contemplated that various modifications and changes may be made to the exemplary embodiments of the invention without departing from the scope of the embodiments of the present invention as defined in the following claims.

What is claimed is:

1. A leg mobile robot comprising:
   a body;
   a leg joined to the body through a first joint in a manner that allows the leg to be actuated; and a foot joined to a distal end of the leg through a second joint, wherein the foot comprises:

a foot flat portion having a ground contact end of the foot;

a movable portion joined to the second joint and configured to be movable in a first direction with respect to the foot flat portion;

a shock absorber comprising first and second end portions allowed to move closer to or away from each other in a second direction different from the first direction, the first end portion of the shock absorber being joined to a first point of the movable portion; and a motion direction conversion mechanism joined swingably to the second end portion of the shock absorber and to a second point of the movable portion, respectively, and configured to convert a motion of the movable portion in the first direction to a motion of the second end portion of the shock absorber in the second direction with respect to the first point of the movable portion, and the shock absorber and the motion direction conversion mechanism forming a combination.

2. The leg mobile robot according to claim 1, wherein the motion direction conversion mechanism comprises a link member comprising first and second end portions, the first end portion of the link member being joined swingably to the foot flat portion, the second end portion of the link member being joined swingably to a rotation shaft provided a predetermined distance separate from the second point of the movable portion.

3. The leg mobile robot according to claim 1, wherein the second direction in which the first and second end portions of the shock absorber are allowed to move closer to or away from each other is parallel to a plane containing the ground contact end of the foot, and the first direction in which the movable portion is configured to be movable with respect to the foot flat portion is perpendicular to the plane containing the ground contact end of the foot.

4. The leg mobile robot according to claim 1, wherein the second direction in which the first and second end portions of the shock absorber are allowed to move closer to or away from each other forms an acute angle with a plane containing the ground contact end of the foot, and the first direction in which the movable portion is configured to be movable with respect to the foot flat portion is perpendicular to the plane containing the ground contact end of the foot.

5. The leg mobile robot according to claim 1, wherein the foot further comprises:

a second shock absorber comprising third and fourth end portions allowed to move closer to or away from each other in a third direction different from the first direction, the third end portion of the second shock absorber being joined to a third point of the movable portion; and a second motion direction conversion mechanism joined swingably to the fourth end portion of the second shock absorber and to a fourth point of the movable portion, respectively, and configured to convert a motion of the movable portion in the first direction to a motion of the fourth end portion of the second shock absorber in the third direction with respect to the third point of the movable portion, and wherein the third and fourth points of the movable portion are disposed symmetrical to the first and second points of the movable portion, respectively, with respect to a plane containing a center of the second joint and perpendicular to a plane containing the ground contact end of the foot.

6. The leg mobile robot according to claim 5, wherein, in a plurality of the combinations of the shock absorber and the motion direction conversion mechanism, each of the shock absorbers is configured such that repulsive force to repel an external force in a expanding/contracting direction of the each shock absorber is adjustable based on floor reaction force acting thereon according to a position thereof on the foot.

7. The leg mobile robot according to claim 6, wherein, the combinations of the shock absorber and motion direction conversion mechanism are disposed on both sides of the foot in a front-back direction across the second joint, the both sides being a side nearer to a tiptoe of the robot and a side nearer to a heel thereof as front and back, respectively, and the repulsive force of the shock absorber disposed on the side nearer to the heel is greater than the repulsive force of the shock absorber disposed on the side nearer to the tiptoe.

8. The leg mobile robot according to claim 1, wherein the shock absorber comprises at least one of a spring buffer and a dashpot.

9. The leg mobile robot according to claim 8, wherein the shock absorber further comprises a displacement sensor configured to detect a reaction force acting on the foot flat portion from a ground surface on which the ground contact end of the foot is put.

10. The leg mobile robot according to claim 1, wherein the foot flat portion comprises an attenuating member disposed at a surface thereof opposite the movable portion, and configured to attenuate an impact caused by a contact of the movable portion.

* * * * *

UNITED STATES PATENT AND TRADEMARK OFFICE
CERTIFICATE OF CORRECTION

PATENT NO. : 7,753,146 B2
APPLICATION NO. : 12/068074
DATED : July 13, 2010
INVENTOR(S) : Susumu Miyazaki and Makoto Shishido It is certified that error appears in the above-identified patent and that said Letters Patent is hereby corrected as shown below:

On the Title Pg, Item (30), please add the second Foreign Application Priority Data January 30, 2008    (JP)    2008-019013

Signed and Sealed this

Twenty-eighth Day of September, 2010

David J. Kappos
*Director of the United States Patent and Trademark Office*